United States Patent
Nashner et al.

(10) Patent No.: US 10,919,326 B2
(45) Date of Patent: Feb. 16, 2021

(54) CONTROLLED ABLATION AND SURFACE MODIFICATION FOR MARKING AN ELECTRONIC DEVICE

(71) Applicant: Apple Inc., Cupertino, CA (US)

(72) Inventors: Michael S. Nashner, San Jose, CA (US); Peter N. Russell-Clarke, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/457,212

(22) Filed: Jun. 28, 2019

(65) Prior Publication Data

US 2020/0009891 A1    Jan. 9, 2020

Related U.S. Application Data

(60) Provisional application No. 62/693,842, filed on Jul. 3, 2018, provisional application No. 62/753,027, filed on Oct. 30, 2018, provisional application No. 62/816,769, filed on Mar. 11, 2019.

(51) Int. Cl.
*B41M 5/24* (2006.01)
*B32B 3/02* (2006.01)
*B32B 3/30* (2006.01)
*B32B 9/04* (2006.01)
*B32B 38/06* (2006.01)

(52) U.S. Cl.
CPC .............. *B41M 5/24* (2013.01); *B32B 3/02* (2013.01); *B32B 3/30* (2013.01); *B32B 9/041* (2013.01); *B32B 38/06* (2013.01)

(58) Field of Classification Search
CPC ...................................... B41M 5/24
USPC .............................................. 428/173
See application file for complete search history.

(56) References Cited

U.S. PATENT DOCUMENTS

| | | |
|---|---|---|
| 1,608,108 A | 11/1926 | Martus et al. |
| 2,473,848 A | 8/1947 | Baxter |
| 2,821,589 A | 1/1958 | Needham |
| 3,123,792 A | 3/1964 | Klemm |
| 3,471,663 A | 10/1969 | Farrell |
| 3,982,917 A | 9/1976 | Upton |
| 4,227,059 A | 10/1980 | Ogawa |
| 4,340,791 A | 7/1982 | Sorenson |

(Continued)

FOREIGN PATENT DOCUMENTS

| | | |
|---|---|---|
| CN | 201945987 | 8/2011 |
| CN | 102725663 | 10/2012 |

(Continued)

OTHER PUBLICATIONS

Author Unknown, Epilog Laser, "iPhone 5 Laser Engraved with Epilog Laser System," YouTube, https://www.youtube.com/watch?v=hAMpp1QFTel, 1 page, Sep. 24, 2012.

(Continued)

*Primary Examiner* — Brent T O'Hern
(74) *Attorney, Agent, or Firm* — Brownstein Hyatt Farber Schreck, LLP

(57) ABSTRACT

An article having a laser-formed marking is disclosed. The article includes a coating defining an exterior surface of the article and the marking extends through the coating. The marking comprises a recessed marking feature which provides a color or other visual attribute to the marking.

20 Claims, 22 Drawing Sheets

(56) References Cited

U.S. PATENT DOCUMENTS

| | | |
|---|---|---|
| 5,180,051 A | 1/1993 | Cook et al. |
| 5,214,530 A | 5/1993 | Coombs et al. |
| 5,215,864 A | 6/1993 | Laakmann |
| 5,327,201 A | 7/1994 | Coleman et al. |
| 5,496,977 A | 3/1996 | Date et al. |
| 5,523,125 A | 4/1996 | Kennedy et al. |
| 5,607,607 A | 3/1997 | Naiman et al. |
| 5,718,326 A | 2/1998 | Larose et al. |
| 5,936,213 A | 8/1999 | Bisquez et al. |
| 6,040,543 A | 3/2000 | Mina et al. |
| 6,084,190 A | 7/2000 | Kenmochi |
| 6,196,738 B1 | 3/2001 | Shimizu et al. |
| 6,201,196 B1 | 3/2001 | Wergen |
| 6,288,905 B1 | 9/2001 | Chung |
| 6,565,770 B1 | 5/2003 | Mayer et al. |
| 6,591,457 B1 | 7/2003 | Howie, Jr. |
| 6,630,635 B1 | 10/2003 | Doepner |
| 6,667,450 B2 | 12/2003 | Bulin et al. |
| 6,707,358 B1 | 3/2004 | Massman |
| 6,762,381 B2 | 7/2004 | Kunthady et al. |
| 7,101,603 B2 | 9/2006 | Okamura et al. |
| 7,165,846 B2 | 1/2007 | Shinya |
| 7,297,221 B2 | 11/2007 | Hikita |
| 7,414,213 B2 | 8/2008 | Hwang et al. |
| 7,530,491 B2 | 5/2009 | Lasch et al. |
| 7,531,765 B2 | 5/2009 | Komagata |
| 7,727,618 B2 | 6/2010 | Iwano |
| 8,003,200 B2 | 8/2011 | Nashiki et al. |
| 8,198,626 B2 | 6/2012 | Lee et al. |
| 8,222,773 B2 | 7/2012 | De Iuliis et al. |
| 8,232,502 B2 | 7/2012 | Young et al. |
| 8,529,775 B2 | 9/2013 | Costin et al. |
| 8,640,413 B2 | 2/2014 | Ruggie et al. |
| 8,672,232 B2 | 3/2014 | Herslow |
| 8,725,589 B1 | 5/2014 | Skelding et al. |
| 8,802,220 B2 | 8/2014 | Cao et al. |
| 8,859,920 B2 | 10/2014 | Manullang et al. |
| 8,859,923 B2 | 10/2014 | Obata et al. |
| 8,867,320 B2 | 10/2014 | Suzuki et al. |
| 8,882,280 B2 | 11/2014 | Fukaya et al. |
| 9,058,547 B2 | 6/2015 | Oh et al. |
| 9,335,868 B2 | 5/2016 | Hotelling et al. |
| 9,569,718 B2 | 2/2017 | Herslow |
| 9,629,271 B1 | 4/2017 | Lancaster-Larocque et al. |
| 9,644,283 B2 | 5/2017 | Hankey et al. |
| 9,678,258 B2 | 6/2017 | Hankey et al. |
| 9,727,178 B2 | 8/2017 | Matsuyuki et al. |
| 9,790,126 B2 | 10/2017 | Matsuyuki et al. |
| 9,844,898 B2 | 12/2017 | Hill et al. |
| 9,916,048 B2 | 3/2018 | Ishibashi et al. |
| 10,071,583 B2 | 9/2018 | Nashner et al. |
| 10,071,584 B2 | 9/2018 | Nashner et al. |
| 10,328,527 B2 | 6/2019 | Lancaster-Larocque et al. |
| 2005/0287301 A1 | 12/2005 | Ljubomirsky |
| 2006/0024476 A1 | 2/2006 | Leland et al. |
| 2009/0166343 A1 | 7/2009 | Lappalainen et al. |
| 2009/0237782 A1 | 9/2009 | Takamatsu et al. |
| 2011/0109590 A1 | 5/2011 | Park et al. |
| 2012/0328905 A1 | 12/2012 | Guo et al. |
| 2013/0112536 A1 | 5/2013 | Shah et al. |
| 2013/0140746 A1 | 6/2013 | Heverly et al. |
| 2016/0327986 A1* | 11/2016 | Farahani ............... G06F 1/1662 |
| 2020/0009891 A1 | 1/2020 | Nashner et al. |

FOREIGN PATENT DOCUMENTS

| | | |
|---|---|---|
| CN | 202632259 | 12/2012 |
| CN | 202649955 | 1/2013 |
| CN | 202854790 | 4/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| GB | 581824 | 10/1946 |
| GB | 957644 | 5/1964 |
| JP | H0593811 | 4/1993 |
| JP | 201263839 | 3/2012 |
| JP | 201410814 | 1/2014 |
| KR | 1020090131944 | 4/2010 |
| TW | M414616 | 10/2011 |
| TW | 201231792 | 8/2012 |
| WO | WO01/15916 | 3/2001 |
| WO | WO01/34408 | 5/2001 |
| WO | WO2011/076294 | 6/2011 |

OTHER PUBLICATIONS

Jaeger, "Color Solid Ink Printing," imaging.org, 4 pages, at least as early as Sep. 23, 2014.

* cited by examiner

US 10,919,326 B2

CONTROLLED ABLATION AND SURFACE MODIFICATION FOR MARKING AN ELECTRONIC DEVICE

CROSS-REFERENCE TO RELATED APPLICATION(S)

This application is a non-provisional patent application of and claims the benefit of U.S. Provisional Patent Application 62/693,842, filed Jul. 3, 2018 and titled "Controlled Ablation and Surface Modification for Marking an Article," U.S. Provisional Patent Application 62/753,027, filed Oct. 30, 2018 and titled "Controlled Ablation and Surface Modification for Marking an Article," and U.S. Provisional Patent Application 62/816,769, filed Mar. 11, 2019 and titled "Controlled Ablation and Surface Modification for Marking an Electronic Device," the disclosures of which are hereby incorporated herein by reference in their entireties.

FIELD

The described embodiments relate generally to forming a marking on an article or component for an electronic device. More particularly, the present embodiments relate to forming a marking including a relief feature which extends at least partially through a coating that defines an exterior surface of the article or component of the electronic device.

BACKGROUND

Articles such as electronic devices generally include an exterior component, such as a housing, that may be marked or printed. Some traditional marking techniques form letters or glyphs using lines of ink. Such markings may be subject to wear over the lifetime of the device.

Embodiments described herein are directed to markings for articles such as electronic devices that may have advantages as compared to markings produced by some traditional techniques. In embodiments described herein, the article includes a coating along an exterior surface and the marking includes a marking feature recessed with respect to the coating. A recessed marking feature may provide a color or other visual attribute to the marking. The markings described herein can provide a distinctive appearance to the article and may also provide improved durability over some traditional ink or paint based marking techniques. In general, the markings formed using the described techniques may not suffer from the drawbacks associated with some traditional ink-based marking techniques.

SUMMARY

Embodiments described herein relate to markings formed along an exterior surface of an article, articles including the markings, and techniques for forming the markings. The marking may be in the form of an image, a pattern, text, a glyph, a symbol, an indicia or a geometric shape. In embodiments, the marking extends through a coating defining an exterior surface of the article and visually contrasts with the coating. The marking may be formed using a laser to allow precise removal of the coating in the marking area and to give a color or other visual attribute to the marking.

In aspects of the disclosure, the article comprises a device component and the marking is formed on the device component. In additional aspects, the article is an electronic device or a component of an electronic device. The device component may comprise a metal material, such as a metal or a metal alloy. The device component may further comprise a coating formed over a surface, such as a front surface, of the metal material. The coating may be a multilayer coating.

In further aspects, the marking comprises a recessed marking feature which provides a color or other visual attribute to the marking. By the way of example, the recessed marking feature is recessed with respect to an exterior surface of the article and defined along an exterior surface of the metal material.

In further aspects, the recessed marking feature is included in a relief feature, which may be laser-formed. The relief feature may further include at least one recess wall that partially defines a recess. The recess may extend through all or a portion of a thickness of the coating. In additional aspect, the marking may comprise additional features, such as a laser-formed color feature formed within the coating.

In embodiments, an electronic device comprises a device component comprising a metal substrate, a coating layer formed along at least a front surface of the metal substrate, and a marking. The coating layer comprises a first layer disposed over the front surface of the metal substrate and comprising a polymer binder and inorganic pigment particles dispersed within the polymer binder. The coating layer further comprises a second layer disposed over the first layer and comprising a transparent polymer defining at least a portion of an exterior surface of the electronic device. The marking is formed along an exterior surface of the electronic device and comprises a laser-formed relief feature. The laser-formed relief feature has at least one recess wall partially defining a recess extending through the first layer and the second layer of the coating. The laser-formed relief feature further has a recessed marking feature defining a bottom of the recess and visually distinct from an adjacent portion of the coating layer.

The recessed marking feature may include a geometric feature, a color feature, and/or a texture feature formed in the front surface of the metal substrate as described in the present disclosure. The recessed marking feature may include at least one geometric feature, such as a groove or channel, formed into the exterior surface of the metal material. As another example, the recessed marking feature may include a color feature having a structural color. For example, a metal oxide layer may be formed on the exterior surface of the device component and have a thickness which imparts a color to the marking (marking color), such as through interference of light. As an additional example, the recessed marking feature may include a texture feature, such as a surface finish defining a roughness of the recessed marking feature. The recessed marking feature may also include combinations of these features. In aspects described herein, the marking comprises at least two recessed marking features.

In additional embodiments, an electronic device comprises a device component comprising a metal material, a multilayer coating formed over a surface of the metal material, and a marking formed into the multilayer coating. The multilayer coating comprises a first layer disposed over the surface of the metal material and comprising a binder and pigment particles dispersed within the binder. The multilayer coating further comprises a second layer disposed over the first layer and comprising a transparent polymer. The marking comprises a first recessed marking feature along a surface of the metal material and visually distinct from the multilayer coating. The marking further comprises a laser-formed relief feature at least partially surrounding the first recessed marking feature. The relief feature has a recess wall partially defining a recess, the recess extending through the first layer and the second layer of the multilayer coating. The laser-formed relief feature further has a second recessed marking feature visually distinct from an adjacent portion of the multilayer coating and defining, in part, a bottom of the recess.

Each of the first and the second recessed marking features may include a geometric feature, a color feature, and/or a texture feature as described in the present disclosure. The second recessed marking feature may be visually distinct from the first recessed marking feature. The first recessed marking feature may also define, in part, a bottom of the recess. For example, the first recessed marking feature may include a color feature and the second recessed marking feature may include a geometric feature which forms a complete or partial perimeter around the first recessed marking feature.

The present disclosure also relates to methods for forming a marking along an exterior surface of an article such as an electronic device or a component for an electronic device. In aspects of the disclosure, a multilayer coating defines the exterior surface of the electronic device and the marking includes a laser-formed relief feature comprising a recessed marking feature and a recess wall at least partially defining a recess in at least a portion of the multilayer coating.

In embodiments, the methods of forming the marking produce little, if any, damage to the multilayer coating adjacent the recessed marking feature. For example, the methods may not change the color and/or texture of the recess wall of the relief feature to an extent visually discernable by the human eye at a normal viewing distance. As another example, the methods n may produce a recess wall and an adjacent portion of the multilayer coating which have no cracks visually discernable to the human eye at a normal viewing distance.

In aspects of the disclosure, the relief feature may be formed using a laser-based treatment as described herein. The laser-based treatment may include at least two different laser-based treatment operations. The at least two different laser-based treatment operations may involve two different lasers or a single laser operated at two different process conditions.

In embodiments, a method for forming a marking comprising a relief feature along an exterior surface of an electronic device comprises removing, using a first laser, a portion of a multilayer coating to form a recess through the multilayer coating and expose a metal portion of a substrate. The multilayer coating is formed over a surface of the substrate and comprises a first layer comprising a binder and inorganic pigment particles dispersed within the binder and a second layer comprising a transparent polymer. The method further comprises modifying the metal portion, using a second laser, to create a recessed marking feature of the relief feature. The recessed marking feature comprises at least one of a geometric feature formed into the metal portion or a color feature formed on the metal portion.

The operation of modifying the metal portion may include one or more of laser texturing and laser coloring the metal portion. The operation of modifying the metal portion may further include laser shaping the metal portion. As previously discussed, in embodiments the operation of modifying the metal portion produces little, if any, damage to the multilayer coating adjacent the recessed marking feature.

BRIEF DESCRIPTION OF THE DRAWINGS

The disclosure will be readily understood by the following detailed description in conjunction with the accompanying drawings, wherein like reference numerals designate like elements.

Figure 1A:
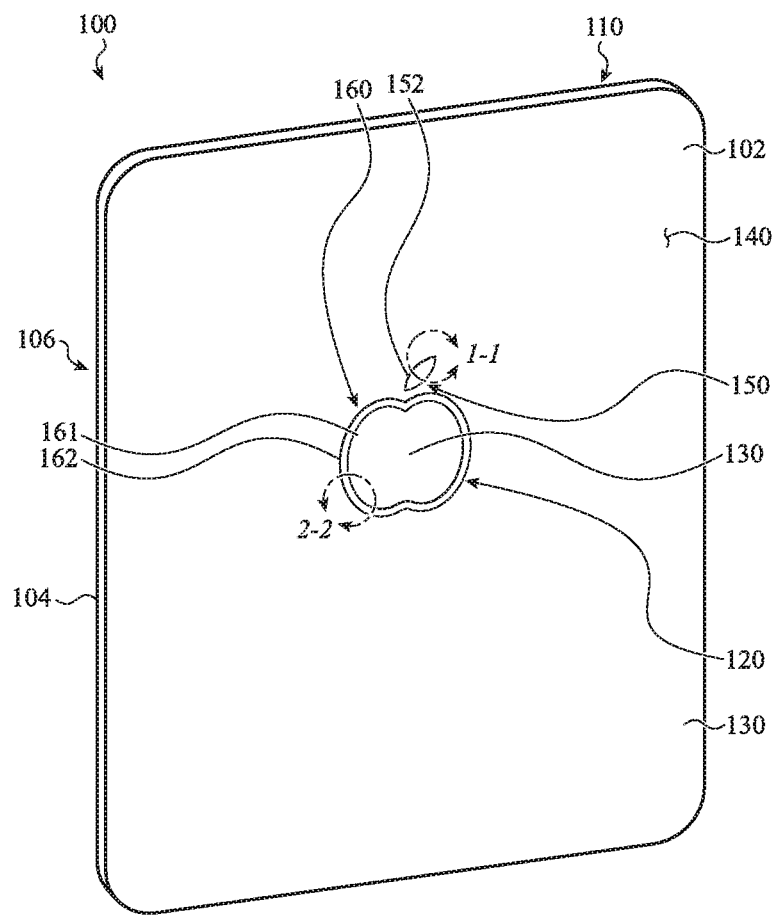
FIG. 1A shows an example article with a marking in accordance with embodiments herein.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure is generally related to forming a marking along an exterior surface of an article. In embodiments, the marking extends through a coating defining the exterior surface of the article. The marking may include laser-formed relief feature having a marking feature which is at least partially recessed with respect to the coating. The relief feature may further include a recess wall that partially defines a recess. In aspects of the disclosure, the article is an electronic device or a component of an electronic device.

The techniques described herein use a laser to form the marking. In aspects of the disclosure, the techniques use a laser to form a relief feature. The laser parameters may be specially adapted to limit or prevent visual defects or cracks within the coating due to thermal effects from the laser. Further, techniques described herein may be adapted to limit removal and/or roughening of a metal material underlying the coating during formation of the recess. Therefore, the laser-based marking techniques described herein may provide an advantage over some traditional techniques which may produce greater disruption of the coating and/or the surface of the metal substrate. As examples, the laser-based marking techniques described herein may provide an advantage over some mechanical engraving or chemical etching techniques. In addition, the laser-based techniques described herein can form recessed marking features having at least one dimension which is micro-scale or milli-scale.

The marking may be in the form of an image, a pattern, text, a glyph, a symbol, an indicia, or a geometric shape. As examples, geometric shapes include, but are not limited to, lines, curves, and shapes such as circles, ovals, and polygons. Polygons include, but are not limited to, triangles, squares, rectangles, pentagons, and hexagons.

The marking may comprise a relief feature which is, in part, recessed with respect to an exterior surface of the coating. For example, the recessed marking feature may be recessed with respect to the exterior surface of the coating. The relief feature may have a depth less than 1 mm, less than 500 µm, from about 100 µm to about 500 µm, from about 50 µm to about 150 µm, or from about 5 µm to about 30 µm. In aspects, the relief feature has a width from about 20 µm to about 100 µm, less than about 1 mm, less than about 1 cm, or less than about 5 cm. Typically, the relief feature is a blind feature and does not extend through the device component.

The relief feature may further comprise one or more recess walls defining a recess in the coating, with the recessed marking feature positioned at least partially below the recess. For example, the relief feature may comprise a pair of recess walls defining a recess in the coating. The recessed marking feature may define a bottom of the recess. The relief feature may further comprise a perimeter at the exterior surface of the coating and may be formed using a laser-based treatment as described herein.

The visual appearance of the marking and the coating may differ in order to provide visual contrast. For example, the recessed marking feature may provide a reflectance and/or color which differs from that of an exterior surface of the coating. In addition, the recessed marking feature may include a geometric feature which is visually discernable. The recessed marking feature may be formed along an external surface of a metal material. The metal material may form a portion or a whole of a substrate. For example, the substrate may be formed of a metal material, in which case the substrate may be referred to as a metal substrate. The recessed marking feature may also be formed along an external surface of a metal portion of the substrate.

By way of example, visually discernable geometric features may be formed as depressions, protrusions, holes, or other geometric forms relative to an exterior surface of the metal material. By the way of example, a geometric feature may have a depth of from 10 µm to 500 µm. The recessed marking feature may include one or more grooves or channels forming a depression in an exterior surface of the metal material. In addition, the recessed marking feature may include a depression whose perimeter defines a circular, oval, or polygonal shape.

In embodiments, a groove or channel may have a width that is narrow relative to a width of the recessed marking feature. For example, a groove or channel may have a width that is less than about 20% or less than about 10% of the width of the recessed marking feature. As an additional example, a groove or channel may have a width that is greater than about 20% of the width of the recessed marking feature and less than or equal to the width of the recessed marking feature. As further examples, a groove may be v-shaped or u-shaped in cross-section 123. As used herein, the terms "about" and "approximately" are used to account for relatively small variations, such as a variation of +/−10%, +/−5%, or +/−2%. As examples, a width of a groove or channel may be greater than its depth, equal to its depth, or less than its depth. In embodiments, a depth of a groove or channel is less than a thickness of the coating.

A groove or channel may take a variety of forms. For example, a groove may form a perimeter around a portion of the recessed marking feature. Additional features of the marking, such as a texture feature (e.g., a surface finish) or a color feature (e.g., a metal oxide layer), may therefore be inward from this perimeter. The recessed marking feature may also include a pattern of multiple grooves. For example, the recessed marking feature may include multiple grooves aligned to form a hatching pattern. As another example, the marking feature may include a first set of grooves aligned to form a first hatching pattern and a second set of grooves aligned to form a second hatching pattern which is angled with respect to the first hatching pattern, thereby forming a crosshatching pattern. As another example, a geometric feature such as an angle or groove may be formed in the surface of the metal material in order to present a region of the recessed marking, at a particular angle with respect to a horizontal plane.

In additional aspects, a geometric feature may provide a degree of isolation between a recess wall of the relief feature and a region of the recessed marking feature which is to undergo a laser-based treatment. Inclusion of such a geometric feature in the recessed marking feature can minimize damage to the recess wall of the relief feature during the laser-based treatment. Suitable geometric features for this purpose include, but are not limited to an angle, a curve, or a groove formed in the surface of the metal material proximate the recess wall of the relief feature. For example, an angle geometric feature may define an obtuse angle (e.g., angle from 110 degrees to 160 degrees) with respect to the region of the recessed marking feature which is to undergo a laser-based treatment.

In aspects of the disclosure, a color feature produces a structural color. Structural colors may result from a variety of effects including interference of light, diffraction of light, and combinations thereof. In embodiments, the color feature includes a metal oxide layer configured to produce a color through interference. The desired color may be produced at a desired viewing angle. In additional embodiments, the color feature includes diffraction features configured to produce a color through diffraction, such as laser induced periodic surface structures. In embodiments, the color feature does not include a paint or an ink.

The color of a color feature may be characterized using a color model. For example, in the hue-saturation-value (HSV) color model, the hue relates to the wavelength(s) of visible light observed when the color feature is viewed (e.g., blue or magenta) and the value relates to the lightness or darkness of a color and relates to the amount of light reflected from the color feature. The saturation relates to the perceived colorfulness as judged in proportion to its brightness. As another example, coordinates in CIEL*a*b* (CIELAB) color space may be used to characterize the color, wherein L* represents brightness, a* the position between red/magenta and green, and b* the position between yellow and blue. A broadband or semi-broadband illuminant may be used to determine the color of the color feature. For example, a CIE illuminant may be used.

Further, color(s) may be characterized in terms of perceived wavelengths of visible light (e.g. from about 380 nm to about 750 nm). Chromatic colors have a hue (such as predominantly red, blue, yellow or green). A spectral color is present in the visible spectrum and is associated with a relatively narrow band of wavelengths. Non-spectral colors may include achromatic colors (such as white, gray or black), colors that are mixtures of spectral colors (such as violet-red colors), colors that are mixtures of spectral colors with achromatic colors, and metallic colors. For example, a violet color may be associated with light having a wavelength from about 380 nm to about 450 nm, a blue color may be associated with light having a wavelength between about 450 nm to about 495 nm, a cyan color may be associated with light having a wavelength from about 490 nm to about 520 nm, a green color may be associated with light having a wavelength between 495 nm and 570 nm, a yellow color may be associated with light having a wavelength from about 570 nm to about 590 nm, an orange color may be associated with light having a wavelength from about 590 nm to 620 nm, and a red color may be associated with light having a wavelength from about 620 nm to about 750 nm. In addition, a magenta color may be associated with light having predominantly red wavelengths and blue/violet wavelengths.

In additional embodiments, the spectral reflectance curve of a marking feature may be used to describe its optical properties. The spectral reflectance curve may be obtained over the visible spectrum or over a broader range, such as from about 400 nm to about 1500 nm. In addition, the extent of specular reflection or directionality of the reflectance may be measured.

A color feature having a metallic color may have a metallic luster. For example, a metallic color with a metallic luster may have a spectral reflectance curve with a relatively high reflectance over a relatively large portion of the visible spectrum and may have predominantly specular reflection. In embodiments, a color feature with a metallic luster has a spectral reflectance of at least 80%, at least 70%, at least 60%, at least 50%, or at least 40% over at least a portion of the visible spectrum. In embodiments, a metallic color may have a largely gray or "silvery" appearance when the spectral reflectivity is substantially uniform across the visible spectrum. The laser coloring process may produce a structural color which modifies a gray or "silvery" appearance of a metal. For example, a laser coloring process may change the spectral reflectance curve to decrease the reflectance in at least a portion of the blue and/or the green portion of the visible spectrum, thereby producing an at least partially golden color feature.

In embodiments, a color feature may include an oxide layer which gives the recessed marking feature a color (i.e., a marking color). The metal oxide may be a thermally grown metal oxide. In additional embodiments, the oxide layer may give the recessed marking feature more than one color. In some aspects, a first portion of the oxide layer may provide a first marking color and a second portion of the oxide layer may provide a second marking color. Alternately, the first portion of the oxide layer may be referred to as a first oxide layer and the second portion of the oxide layer may be referred to as a second oxide layer.

In embodiments, a portion of the oxide may have a thickness or a thickness range configured to produce a desired hue or combination of hues, such as at a desired viewing angle. In additional aspects, the thickness of the oxide layer may vary such that the color feature blends different colors. For example, when the size of the recessed marking feature is significantly greater than the spot size of the laser used to form the color feature, differences in heating of the metal substrate may produce some variation in the oxide layer thickness over the recessed marking feature.

A texture feature may include a texture formed into the external surface of the metal material. In embodiments, the texture feature includes a surface finish. The surface finish may define, at least in part, a reflectance of the recessed marking feature. As an example, the surface finish may be characterized by the roughness of the external surface of the metal material. In additional embodiments, a texture feature may include fine geometric features, such as hatching lines, formed into the metal material. The texture may be coated with a relatively thin oxide layer formed during the texturing process. In embodiments, the relatively thin oxide layer may produce little, if any, color effect and may have a thickness less than 5 nm, less than 3 nm, or less than 2 nm.

In embodiments, the laser-formed relief feature extends through a multilayer coating. For example, a coating layer may comprise a first layer disposed over the metal material and a second layer disposed over the first layer. In further aspects, the coating layer consists of or consists essentially of the first layer and the second layer. The first coating layer may comprise pigment particles and a binder. The pigment particles may be inorganic pigment particles, such as metal oxide particles or carbon particles. In some aspects of the disclosure, the inorganic pigment particles give the first coating layer a white color or a black color. The binder may be a polymer or resin binder, such as an acrylate or an epoxy binder. The pigment particles may be dispersed within the binder.

The second coating layer may comprise a transparent polymer. The transparent polymer may have a hardness and/or an abrasion resistance greater than that of the first coating layer. For example, the second coating layer may comprise an acrylate polymer or an epoxy polymer. The second coating layer may also comprise filler materials, such as nanoscale inorganic or diamond materials. By the way of example, the multilayer coating may have a thickness less than 1 mm, such as from about 50 µm to about 500 µm.

In additional aspects, the marking further comprises other features. In embodiments, a laser-formed color feature may be formed in a layer of the coating. For example, exposure of pigment particles in the first coating to a laser beam may induce a color change in the pigment particles which can be used to form a marking. As an additional example, exposure of titanium dioxide particles in the first coating layer to the laser beam can produce a darker color feature within the coating.

These and other embodiments are discussed below with reference to FIGS. 1A-16. However, those skilled in the art will readily appreciate that the detailed description given herein with respect to these figures is for explanatory purposes only and should not be construed as limiting.

FIG. 1A depicts a simplified example of an article. In some embodiments, the article 100 is an electronic device incorporating one or more electronic components. The article 100 may also be a component of an electronic device including, for example, a housing, enclosure, or cover of an electronic device. The electronic device may be a portable electronic device or other suitable electronic device. For example, the portable electronic device may be a laptop computer or a tablet. As additional examples, the portable electronic device may be a wrist-watch, a media player, a mobile phone, a camera, a headphone device, an earpiece device, a remote control, an identifier (e.g., a card), or other electronic device.

In additional aspects of the disclosure, the article 100 may include a data bearing record, but need not incorporate an electronic component. As examples, the article 100 may have optical features and/or magnetic features which are capable of storing data and which are readable by a component of a data processing system. The article 100 may be portable. As example, the article 100 may be part of a laptop computer, a tablet, a wrist-watch, a media player, a mobile phone, a camera, a headphone device, an earpiece device, a remote control or may be an identifier (e.g., a card), or other such article.

As shown in FIG. 1A, the article 100 has an exterior surface 102 and a marking 120 has been formed along exterior surface 102. The location of the marking is not limited, and marking 120 may be formed on the exterior surface 106, the exterior surface 104, and/or the exterior surface 102 of the article 100. As examples, the exterior surface 102 may be a front or a back surface of the device and the exterior surface 104 may be a side surface of the device. As shown, the article 100 includes a coating 130 which defines at least a portion of exterior surface 102. The coating 130 may be formed along an exterior surface 112 of the metal substrate 140, as shown in FIG. 1D.

The article 100 further includes a device component 110. The device component 110, alone or in combination with other device components, may define an internal volume configured to receive one or more internal components of the article 100. For example, the device component 110 may be a component of a housing, enclosure, or cover for the article 100. The internal components of the article 100 may include various electronic components. For example, the electronic components may include one or more of a processor, control circuitry, a sensor, memory, and a battery. An example electronic device is described below with respect to FIG. 16 and the description provided there is generally applicable to articles as described herein.

As shown in FIG. 1A, the marking 120 further includes a first relief feature 150 and a second relief feature 160. The first relief feature 150 includes a perimeter 152 at the exterior surface 102 of the article 100. The second relief feature 160 includes an interior perimeter 161 and an exterior perimeter 162 at exterior surface 102; the interior perimeter 161 forms an outline around a portion of the coating 130. The visual appearance of the first relief feature 150 and the second relief feature 160 may differ from each other or may be the same. The visual appearance of each of the first relief feature 150 and the second relief feature 160 differs from that of the coating 130. For example, the first relief feature 150 and the second relief feature 160 may be visually distinct from a portion of the coating layer adjacent to the laser-formed relief feature. For example, an adjacent portion of the coating may include an exterior surface of the coating layer and may form a perimeter around the relief feature.

Figure 1B:
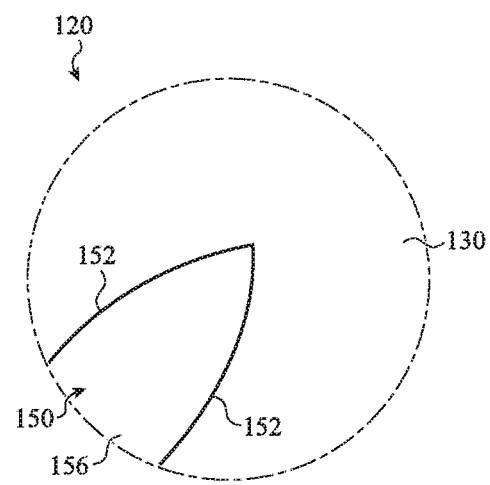
FIG. 1B shows an enlarged view of the marking of FIG. 1A showing a top view of a relief feature.

FIG. 1B shows an enlarged top view of the relief feature 150 of FIG. 1A (Detail 1-1). As shown in FIG. 1B, the relief feature 150 comprises a recessed marking feature 156. The relief feature 150 also comprises a perimeter 152 defined by the exterior surface of the coating 130. The recessed marking feature 156 may have a visual appearance different from that of the coating 130 so that it is visually distinct from an adjacent portion of the coating (e.g., the coating adjacent perimeter 152). In some embodiments, the recessed marking feature may have at least one dimension, such as a width, which is micro-scale (having a dimension greater than or equal to 1 micron and less than 1 millimeter). In additional embodiments, the recessed marking feature may have at least one dimension, such as a width, which is milli-scale (having a dimension greater than or equal to 1 millimeter and less than 1 centimeter).

Figure 1C:
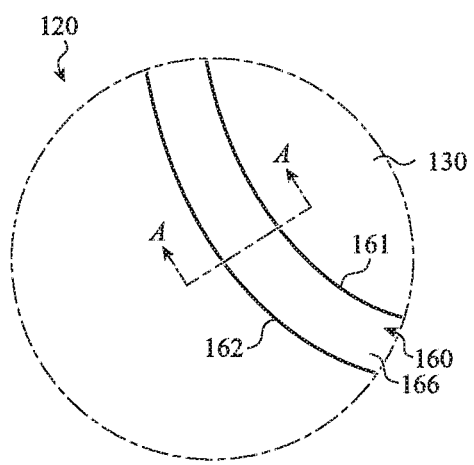
FIG. 1C shows an enlarged view of the marking of FIG. 1A showing a top view of another relief feature.
Figure 1D:
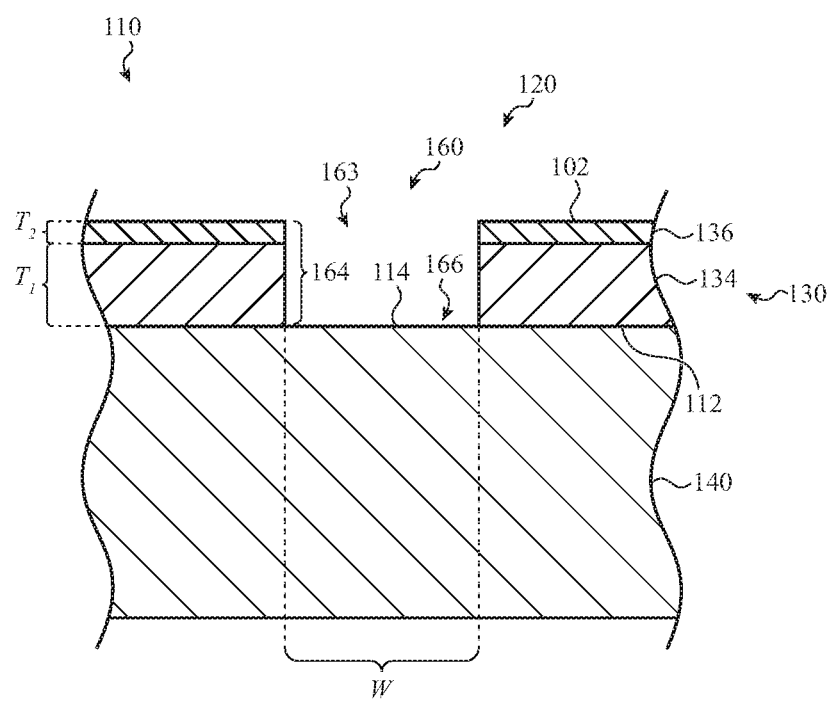
FIG. 1D shows an example of a cross-sectional view of the marking of FIG. 1C.

FIG. 1C shows an enlarged top view of the relief feature 160 of FIG. 1A (Detail 2-2). As shown in FIG. 1C, the relief feature 160 comprises a recessed marking feature 166. The recessed marking feature 166 may have a visual appearance different from that of the coating 130. The relief feature 160 also comprises an interior perimeter 161 and an exterior perimeter 162 defined by the exterior surface of the coating 130.

FIG. 1D is an example cross-sectional view of the relief feature 160 of FIG. 1C. FIG. 1D provides an example of a fine marking which can be produced using a laser-based technique to remove some of the coating 130 and expose some of a metal substrate 140. As shown, removal of some of the coating does not significantly distort the remainder of the coating or the underlying metal substrate. Although the exposed metal substrate 140 is depicted as being flat, this is not limiting, as described below with respect to the examples of FIGS. 1E, 2-5, 6B, 7-9, and 10B. In additional examples, the metal substrate may be referred to as a metal material. Further, a metal oxide layer may be formed on the exposed metal substrate as described below with respect to FIGS. 6A-9.

The relief feature 160 comprises a recessed marking feature 166, which is recessed with respect to the exterior surface 102 of the article 100. The recessed feature 166 is positioned below a recess 163 in the coating 130 and has a width W. The coating 130 around the recess 163 defines recess walls 164 (side walls) of the relief feature 160. Although the recess walls 164 are shown as forming an angle of about 90° with respect to surface 112, this is not limiting, as shown with respect to FIG. 1E. An exterior surface of the coating 130 defines at least a portion of the exterior surface 102 of the article 100.

As shown in FIG. 1D, the coating 130 is formed along an exterior surface 112 of the metal substrate 140 and the recessed marking feature 166 is formed along an exterior surface 114 of the metal substrate 140. The exterior surface 112 may be a first portion and the exterior surface 114 may be a second portion of the exterior or outer surface of the metal substrate 140. The exterior surface 114 is not required to be at the same height as the exterior surface 112. For example, laser-based treatment of exterior surface 114 may cause the exterior surface 114 to be recessed with respect to the exterior surface 112. In some embodiments, the exterior surface 114 is recessed by 5 µm or less, 3 µm or less, 2 µm or less, or 1 µm, or less with respect to the exterior surface 112. As for the exterior surface 102, the exterior surface 114 may be a front, a back, or a recess wall of the metal substrate.

The exterior surface 114 may have a texture which gives the recessed marking feature a visual attribute. For example, the exterior surface 114 may have a surface finish with a roughness corresponding to that of a polished surface. The roughness of the exterior surface 114 may be from about 1 µm to about 5 µm. In additional example, the roughness of the exterior surface 114 may be greater than 5 µm, or greater than 10 µm. One measure of surface roughness is the parameter Ra which is a measure of the amplitude of the roughness profile (arithmetic average value of roughness determined from deviations about a center line). Another parameter is Sm, which is the mean spacing between peaks in the roughness profile. Reflectance may also be used as a measure of surface roughness. The foregoing discussion of texture and surface finish is not limited to the example of FIG. 1D, but applies more generally to texture features of the present disclosure.

Further, the exterior surface 114 may include an oxide layer which gives the recessed marking feature a marking color. The metal oxide may be a thermally grown metal oxide. For example, the metal oxide layer may be thermally grown on a metal material by laser heating of the substrate. Suitable metal materials include, but are not limited to, titanium alloys, steels, or zirconium based, titanium-based, or iron-based bulk solidifying alloy substrates. In some embodiments, the metal material is predominantly crystalline and may have percentage of crystalline phase(s) greater than 50%, 60%, 70%, 80%, or 90%. In some embodiments, the thermally grown metal oxide may have a porosity less than that of an anodically grown porous metal oxide. In embodiments, the metal oxide may comprise a titanium oxide, an iron oxide, a chromium oxide, a zirconium oxide or combinations thereof.

The thickness of a metal oxide layer can affect the color of the recessed marking feature in several ways. For example, a metal oxide layer may display a color as a result of interference of light reflected from the metal oxide and the underlying metallic substrate. Typically the interference color displayed depends upon the thickness of the metal oxide. A metal oxide having a thickness too great to display interference colors may appear dark. When the metal oxide is very thin (or is not present), the recessed marking feature may appear bright or metallic. A variety of colors may be obtained, including, but not limited to, blue, purple, pink, red, orange, yellow, gold, brown, and green. Suitable thicknesses of the metal oxide layer to achieve a color from light interference may depend on the composition and crystallinity of the layer as well as the desired color to be achieved. As an example, a thickness of the metal oxide layer may be from 50 nm to 500 nm to obtain a color through interference of light. The foregoing discussion of color features including a metal oxide layer is not limited to the example of FIG. 1D, but applies more generally to color features of the present disclosure.

The coating 130 may be a multilayer coating. As shown in FIG. 1D, the coating 130 includes a first coating layer 134 having a thickness T1 and a second coating layer 136 having a thickness T2. The thickness of the first coating layer may be greater than that of the second coating layer. In some embodiments the combined thickness of the coating layers is from 50 µm to 500 µm or from 100 µm to 300 µm. The first coating layer 134 is disposed over the exterior surface 112 of the metal substrate 140 and, as shown in FIG. 1D, may contact the exterior surface 112 at an interface between the coating 130 and the metal substrate 140. The second coating layer 136 is disposed over the first coating layer 134. In some instances, the first coating layer 134 may be positioned over or may include a primer layer that coats or is positioned along a surface of the metal substrate 140. The primer may include a polymer material including, for example, a urethane, acrylate or polymer material that facilitates adhesion to the metal substrate 140. For purposes of this description, the first coating layer 134 may include a sub layer or layers of primers or other materials. That is, the first coating layer 134 is not necessarily homogenous or uniform throughout the thickness of the layer.

In embodiments, the first coating layer 134 comprises pigment particles and a polymer binder. As an example, the pigment particles may be inorganic pigment particles. Inorganic pigments include, but are not limited to, metal oxides such as titanium oxides ($TiO_2$, $Ti_2O_3$), zinc oxides (ZnO), manganese dioxide ($MnO_2$), and iron oxides ($Fe_3O_4$). The particles may have a size range of 0.1 µm to 10 µm or 0.1 µm to 1 µm. Suitable polymers for the binder include, but are not limited to, single urethane polymers, multi urethane polymers, polyurethane, acrylate polymers, and epoxy polymers. The first coating layer may further comprise other additives in addition to the pigment. When the first coating layer 134 includes a sub layer of a primer, the first coating layer 134 may also include another sub layer comprising the pigment particles and the polymer binder.

In embodiments, the second coating layer 136 is transparent and comprises a transparent polymer. The transparent polymer may have a hardness and/or an abrasion resistance greater than that of the first coating layer. For example, the second coating layer may comprise an acrylate polymer or an epoxy polymer. The second coating may be a UV curable acrylic or other type of optically cured polymer. The second coating layer may also comprise filler materials, such as nanoscale inorganic or diamond materials. Nanoscale filler materials may have a diameter less than 100 nm or less than 50 nm. The second coating layer may also include various fillers including, for example, wax fillers, fluoropolymers, silica fillers, fluorosurfactant surface modifiers, and other materials. The second coating layer 136 may be treated to provide a particular surface texture or hand feel. In some instances, the second coating may provide a ceramic-like feel to the touch. For example, the second coating layer may include a UV curable acrylic having wax and silica fillers sufficient to simulate a smooth ceramic-like friction between the surface and the skin of a user's finger. The foregoing discussion of the first and second coating layers is not limited to the example of FIG. 1D, but applies more generally to multilayer coatings of the present disclosure.

Figure 1E:
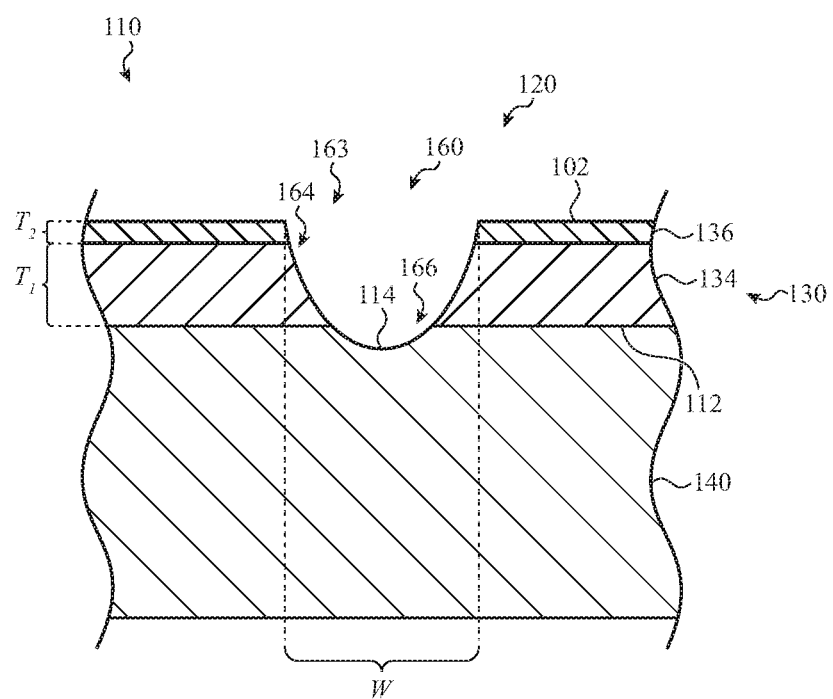
FIG. 1E shows another example of a cross-sectional view of the marking of FIG. 1C.

FIG. 1E is another example cross-sectional view of the relief feature 160 of FIG. 1B. FIG. 1E provides another example of a fine marking which can be produced using a laser-based technique to remove some of the coating 130 and expose some of the metal substrate 140. As shown, removal of some of the coating does not significantly distort the remainder of the coating or the underlying metal substrate. Although the exposed metal substrate 140 is depicted as being concave, this is not limiting. Further, a metal oxide layer may be formed on the exposed metal substrate as described below with respect to FIGS. 6A-9.

The relief feature 160 comprises a recessed marking feature 166, which is recessed with respect to the exterior surface 102 of the article 100. The recessed feature 166 is positioned below a recess 163 formed at least in part in the coating 130 and the recessed feature 166 has a width W. The coating 130 around the recess 163 defines recess walls 164 (side walls) of the relief feature 160. Although recess walls 164 are shown as having an oblique angle with respect to surface 112, this is not limiting. An exterior surface of the coating defines at least a portion of the exterior surface 102 of the article 100.

FIGS. 2-9 and 10B illustrate schematic cross-sectional views of markings along exterior surfaces of example articles. By the way of example, the exterior surfaces of the articles of FIGS. 2-9 and 10B may be front surfaces of the article. Alternately, the exterior surfaces of the articles of FIGS. 2-9 and 10B may be a back surfaces or side surfaces of the article. In aspects of the disclosure, the articles of FIGS. 2-9 and 10B are electronic devices.

Figure 2:
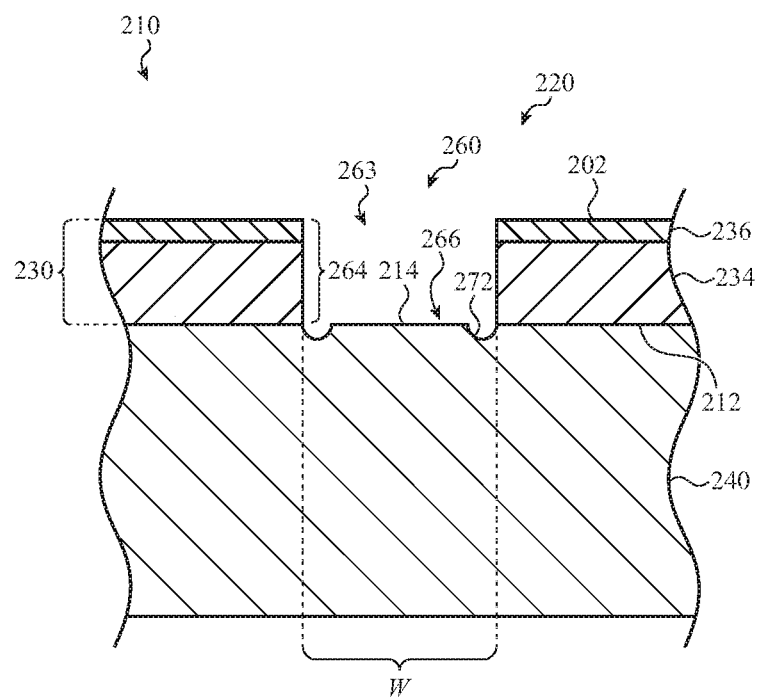
FIG. 2 shows a schematic cross-sectional view of an example marking comprising a recessed marking feature including a geometric feature.

FIG. 2 shows a schematic cross-sectional view of an example marking 220 comprising a recessed marking feature 266 including a geometric feature 272. As illustrated in FIG. 2, the geometric feature 272 is a groove formed in the exterior surface 214 of a metal material 240, which may also be referred to as a metal substrate. As shown, the groove 272 is proximate the recess wall 264 of the relief feature 260. The groove may have a rounded cross-sectional shape. As an example, a width of the groove may be about 10% or less of the width W of the recessed marking feature.

As shown in FIG. 2, the device component 210 includes the marking 220 along an exterior surface 202 of the article. The device component 210 includes a coating 230 along an exterior surface 212 of the metal material 240. The coating includes a first layer 234 and a second layer 236. The marking 220 comprises a relief feature 260 including a recessed marking feature 266 and recess wall 264. The recess wall 264 at least partially defines a recess 263.

Figure 3:
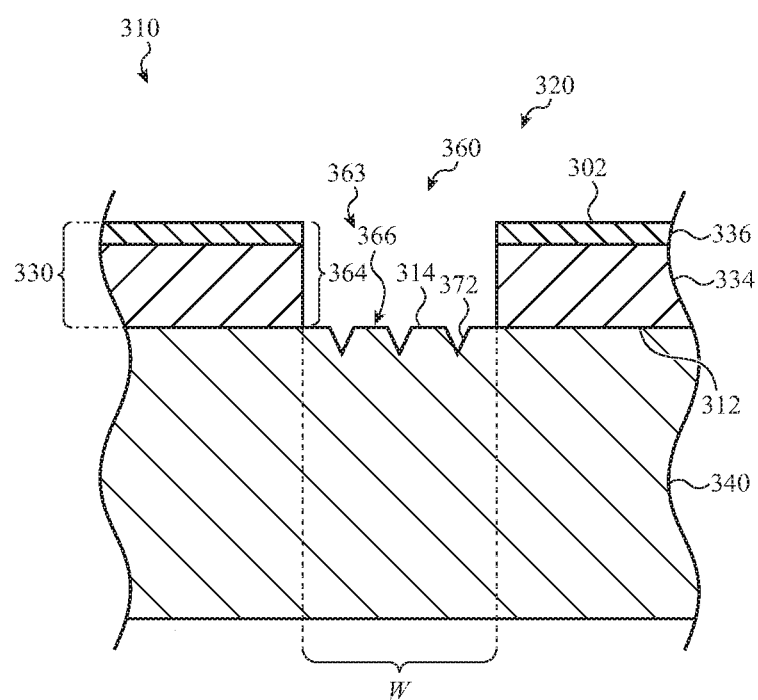
FIG. 3 shows a schematic cross-sectional view of an example marking comprising a recessed marking feature including multiple geometric features.

FIG. 3 shows a schematic cross-sectional view of an example marking 320 comprising a recessed marking feature 366 including multiple geometric features 372. As shown in FIG. 3, the geometric features 372 are grooves formed in an exterior surface 314 of a metal material 340. As illustrated, the grooves 372 have an angular cross-sectional shape and are arranged to form a pattern. As an example, a width of the groove may be about 10% or less of the width W of the recessed marking feature.

As shown in FIG. 3, the device component 310 includes the marking 320 along an exterior surface 302 of the article. The device component 310 includes coating 330 along an exterior surface 312 of the metal material 340. The coating includes a first layer 334 and a second layer 336. The marking 320 comprises a relief feature 360 including recessed marking feature 366 and recess wall 364. The recess wall 364 at least partially defines a recess 363.

Figure 4:
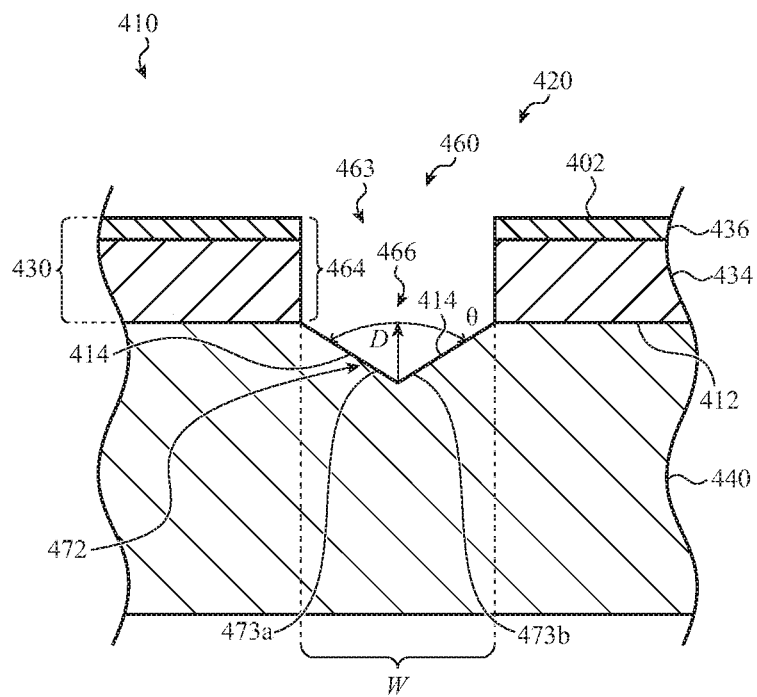
FIG. 4 shows a schematic cross-sectional view of another example marking comprising a recessed marking feature including a geometric feature.

FIG. 4 shows a schematic cross-sectional view of another example marking 420 comprising a recessed marking feature 466 including a geometric feature 472. As shown in FIG. 4, the geometric feature 472 is a channel (or groove) formed in an exterior surface 414 of a metal material 440 and having an angular cross-sectional shape. The channel 472 may have a width about equal to the width W of the recessed marking feature 466. For example, a width of the geometric feature may be from about 80% to 100% of the width of the recessed marking feature 466. An angle θ between walls 473a and 473b may be greater than about 45 degrees and less than 180 degrees or from about 60 degrees to about 120 degrees. The walls 473a and 473b may also be referred to as a pair of channel or groove walls.

As shown in FIG. 4, a device component 410 includes the marking 420 along an exterior surface 402 of the article. The device component 410 includes a coating 430 along an exterior surface 412 of the metal material 440. The coating 430 includes a first layer 434 and a second layer 436. The marking 420 comprises a relief feature 460 including the recessed marking feature 466 and a recess wall 464. Recess wall 464 at least partially defines a recess 463.

Figure 5:
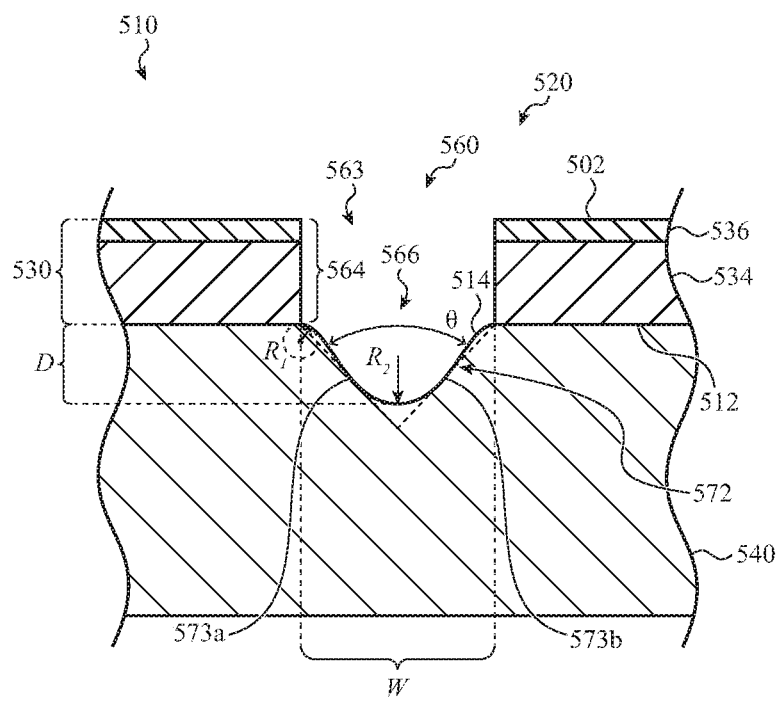
FIG. 5 shows a schematic cross-sectional view of an additional example marking comprising a recessed marking feature including a geometric feature.

FIG. 5 shows a schematic cross-sectional view of an additional example marking 520 comprising a recessed marking feature 566 including a geometric feature 572. As shown in FIG. 5, the geometric feature 572 is a channel formed in an exterior surface 514 of a metal material 540 and having a rounded cross-sectional shape. The rounded cross-sectional shape may be described by a first radius of curvature $R_1$ proximate the recess wall 564 and a second radius of curvature $R_2$ at the bottom of the channel. As shown, the second radius of curvature may have larger a magnitude than that of the first radius of curvature and may produce curvature of opposite direction or sign. The channel 572 may have a width about equal to the width W of the recessed marking feature 566. For example, a width of the channel may be from about 80% to 100% of the width W of the recessed marking feature 566. An angle θ between walls 573a and 573b may be greater than about 45 degrees and less than 180 degrees or from about 60 degrees to about 120 degrees. The channel 572 may have a depth D.

As shown in FIG. 5, a device component 510 includes the marking 520 along an exterior surface 502 of the article. The device component 510 includes a coating 530 along an exterior surface 512 of the metal material 540. The coating includes a first layer 534 and a second layer 536. The marking 520 comprises a relief feature 560 including the recessed marking feature 566 and the recess wall 564. The recess wall 564 at least partially defines recess 563.

Figure 6A:
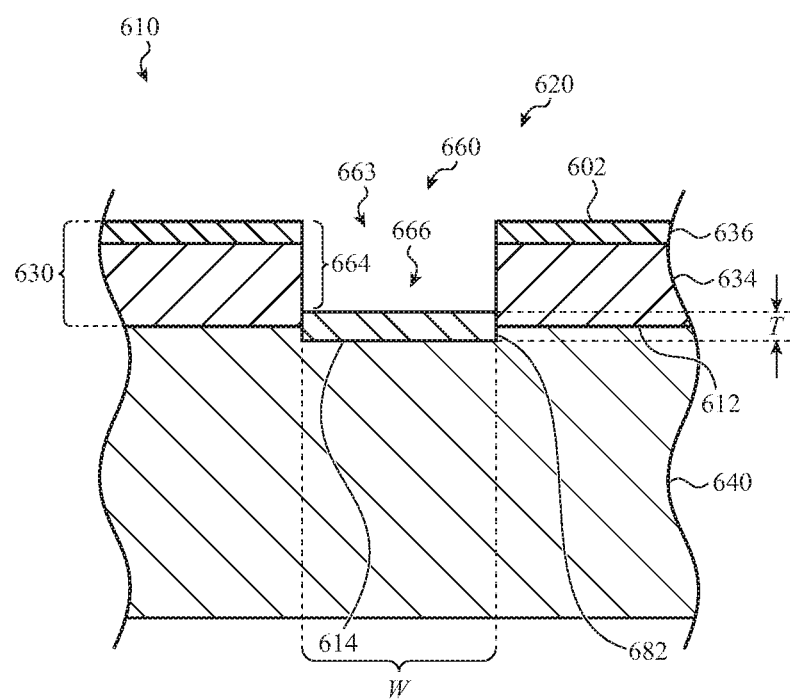
FIG. 6A shows a schematic cross-sectional view of an example marking comprising a recessed marking feature including a metal oxide layer.

FIG. 6A shows a schematic cross-sectional view of an example marking 620 comprising a recessed marking feature 666 including a metal oxide layer 682 formed along an exterior surface 614 of a metal material 640. As shown, the metal oxide layer 682 may have a thickness T and may extend across a width about equal to the width W of the recessed marking feature 666. As previously discussed, the thickness of the metal oxide layer 682 may be configured to produce a structural color through interference.

As shown in FIG. 6A, the thickness of the metal oxide layer 682 is substantially uniform. However, the illustration of FIG. 6A is not limiting and the thickness of the metal oxide layer may vary across the recessed marking feature. In embodiments, an oxide layer of varying thickness may be described by an average thickness or by a thickness range. In an embodiment, the extent of metal oxide thickness variation (e.g., the thickness range) may be small enough that the colors of the recessed marking feature are encompassed by single spectral color or hue (e.g., blue or green). In other embodiments, the recessed marking feature may display multiple distinct spectral colors or hues or a blending of different colors. In some embodiments, the desired viewing angle is about normal to the recessed marking feature 666.

As shown in FIG. 6A, a device component 610 includes the marking 620 along an exterior surface 602 of the article. A device component 610 includes a coating 630 along an exterior surface 612 of metal material 640. The coating 630 includes a first layer 634 and a second layer 636. The marking 620 comprises a relief feature 660 including the recessed marking feature 666 and a recess wall 664. The recess wall 664 at least partially defines a recess 663. As shown in FIG. 6A the exterior surface 614 under the metal oxide layer 682 may be recessed with respect to exterior surface 612 under the coating 630 due to growth of the metal oxide layer 682 into the metal material 640.

Figure 6B:
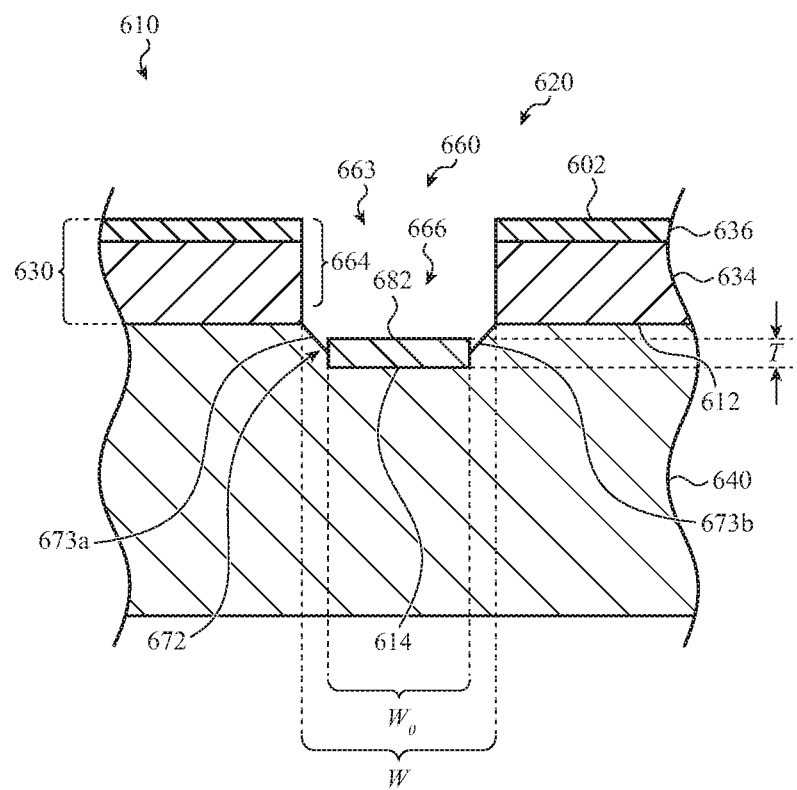
FIG. 6B shows a schematic cross-sectional view of another example marking comprising a recessed marking feature including a metal oxide layer.

FIG. 6B shows a schematic cross-sectional view of an example marking 620 comprising a recessed marking feature 666 including a metal oxide layer 682 formed along an exterior surface 614 of a metal material 640. As shown, the metal material 640 defines a channel 672 including walls 673a, 673b. The metal oxide layer 682 is positioned within the channel, has a thickness T, and extends across a width $W_O$ less than the width W of the recessed marking feature 666. As previously discussed, the thickness of the metal oxide layer 682 may have a thickness or a thickness range configured to produce a desired hue or combination of hues, such as at a desired viewing angle. In embodiments, the desired viewing angle is about normal to the recessed marking feature 666.

In addition, the walls 673a, 673b may each be viewed as angled geometric features which form a complete or partial perimeter around the metal oxide layer 682. The walls 673a, 673b may define an obtuse angle (e.g., angle from 110 degrees to 160 degrees) with respect to a plane of the metal oxide layer 682 or the exterior surface 602. Similarly, a complementary angle between walls 673a, 673b and the recess wall 664 may be an acute angle.

As shown in FIG. 6B, a device component 610 includes the marking 620 along an exterior surface 602 of the article. The device component 610 includes a coating 630 along an exterior surface 612 of the metal material 640. The coating includes a first layer 634 and a second layer 636. The marking 620 comprises a relief feature 660 including the recessed marking feature 666 and a recess wall 664. The recess wall 664 at least partially defines a recess 663. As shown in FIG. 6B the exterior surface 614 under the metal oxide layer 682 is recessed with respect to exterior surface 612 under the coating 630.

In additional embodiments, one or more geometric features may be formed in the metal oxide layer. The geometric feature may be any geometric feature described herein. The multiple geometric features may form a pattern. For example, multiple aligned grooves may form a hatching.

Figure 7:
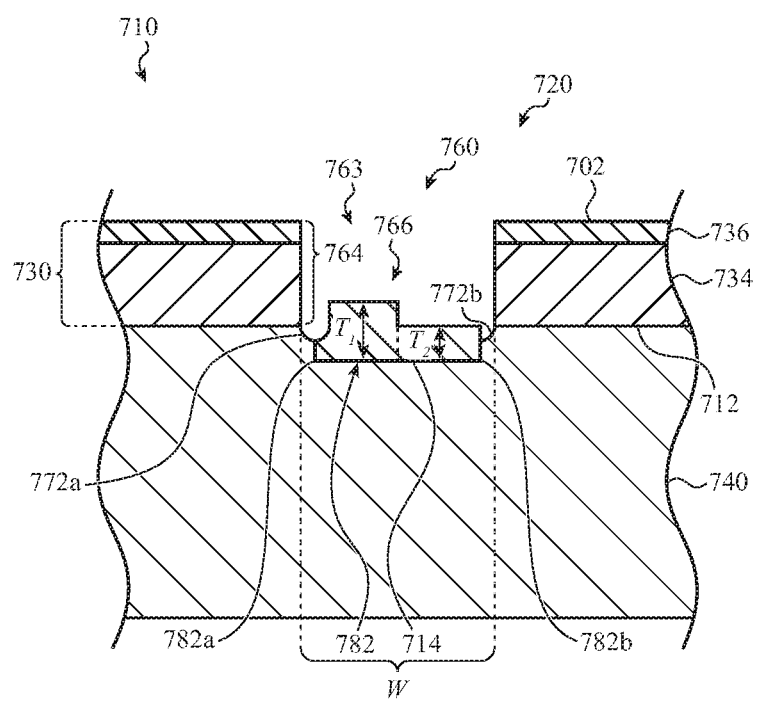
FIG. 7 shows a schematic cross-sectional view of an example marking comprising a geometric feature and a recessed marking feature including a metal oxide layer.

In additional aspects, a marking may include a recessed marking feature including a first color defined, in part, by a first metal oxide thickness and a second color defined, in part, by a second metal oxide thickness. FIG. 7 shows a schematic cross-sectional view of an example marking 720 comprising a recessed marking feature 766 including a metal oxide layer 782a, 782b and a geometric feature 772a, 772b.

As shown, the metal oxide layer 782 may be formed along an exterior surface 714 of a metal material 740 and may include a first portion 782a having a first thickness $T_1$ and a second portion 782b having a second thickness $T_2$. The first portion of the metal oxide layer may provide a first color and the second portion of the metal oxide layer may provide a second color. The first color and/or the second color may be defined, in part, by light interference. As previously discussed, the thickness of the first portion 782a and the second portion 782b of the oxide layer may have a thickness or a thickness range configured to produce a desired hue or combination of hues, such as at a desired viewing angle. In embodiments, the desired viewing angle is about normal to the recessed marking feature 766.

Recessed marking features including a first metal oxide thickness and a second metal oxide thickness may be obtained by various methods. The second portion of the oxide layer may be grown to a different thickness than the first portion of the oxide layer. Further, laser ablation may be used to reduce the thickness of the oxide layer to the first and/or the second thickness. Alternately, the first portion of the oxide layer may be referred to as a first oxide layer and the second portion of the oxide layer may be referred to as a second oxide layer.

As shown in FIG. 7, the geometric feature 772a, 772b is a groove formed in an exterior surface 714 of the metal material 740 proximate the recess wall 764 of the relief feature. The geometric feature 772a, 772b is also shown as having a rounded cross-sectional shape. FIG. 7 shows the groove as having two portions 772a, 772b; the groove shown in FIG. 7 may form a full or partial loop. As shown, the metal oxide layer 782 is at least partially inward from portions 772a, 772b of the groove. The metal oxide layer 782 extends across a width about equal to a distance between portions 772a, 772b of the groove.

As shown in FIG. 7, a device component 710 includes the marking 720 along an exterior surface 702 of the article. The device component 710 includes a coating 730 along an exterior surface 712 of the metal material 740. The coating includes a first layer 734 and a second layer 736. The marking 720 comprises a relief feature 760 including the recessed marking feature 766 and a recess wall 764. Recess wall 764 at least partially defines a recess 763. When the metal oxide layer 782 grows upward from the level of the exterior surface 712, a portion of the recess 763 may be to the side of, rather than above, the recessed marking feature 766.

Figure 8:
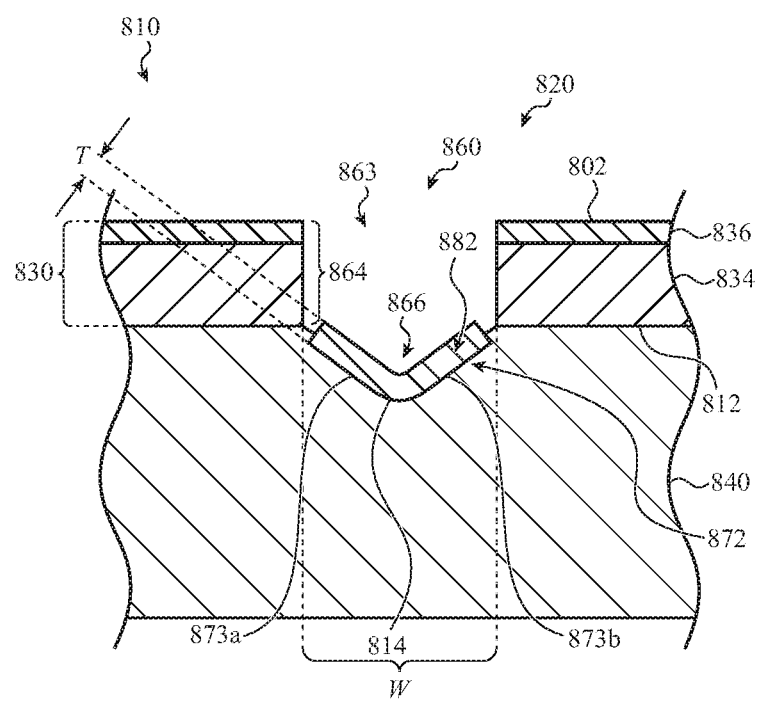
FIG. 8 shows a schematic cross-sectional view of an additional example marking comprising a recessed marking feature including a geometric feature and a metal oxide layer.

FIG. 8 shows a schematic cross-sectional view of an additional example marking 820. Marking 820 includes a relief feature 860 comprising a geometric feature 872 and a recessed marking feature 866 including a metal oxide layer 882. As shown, the metal oxide layer 882 is formed over the geometric feature 872 and has a thickness T. As previously discussed, the metal oxide layer 882 may have a thickness or a thickness range configured to produce a desired hue or combination of hues, such as at a desired viewing angle. In embodiments, the desired viewing angle is about normal to the coating 830.

As shown in FIG. 8, the geometric feature 872 may be a channel formed in an exterior surface 814 of the metal material 840. The channel 872 may have a cross-sectional shape which defines walls 873a and 873b. An angle between the walls 873a and 873b may be greater than about 45 degrees and less than 180 degrees or from about 60 degrees to about 120 degrees. The channel feature 872 may have a width about equal to the width W of the recessed marking feature 866, such as from about 80% to 100% of the width of the recessed marking feature 866.

The metal oxide layer 882 is formed along an exterior surface 814 of metal material 840 and along at least a portion of the exterior surface of channel 872. As shown, the metal oxide layer 882 extends across a width about equal to the width W of the recessed marking feature 866. An exterior surface of the oxide layer 882 on wall 873*a* may form an angle with an exterior surface of the oxide layer 882 on wall 873*b* due to the underlying channel geometry. This angle may be greater than about 45 degrees and less than 180 degrees or from about 60 degrees to about 120 degrees.

As shown in FIG. 8, a device component 810 includes a marking 820 along an exterior surface 802 of the article. The device component 810 includes a coating 830 along an exterior surface 812 of a metal material 840. The coating 830 includes a first layer 834 and a second layer 836. The marking 820 comprises a relief feature 860 including the recessed marking feature 866 and a recess wall 864.

In further aspects, a marking may include a recessed marking feature including a first color defined, in part, by a first metal oxide thickness along a first wall of a groove or channel and a second color defined, in part, by a second metal oxide thickness along a second wall of the groove or channel. An apparent color of the recessed marking feature may be due to a combined effect of the first color and the second color. The apparent color of such a recessed marking feature may depend upon viewing angle. For example, from some viewing angles approximately equal amounts of the first wall and the second wall may be visible, and both the first and the second colors may be visible as distinct colors. From other viewing angles, the visible amount of the first wall may be significantly less than that of the second wall, and the color of the recessed marking feature may be dominated by the first color or may appear to have the first color (and vice versa). The apparent color of the recessed marking feature may therefore appear to shift as the viewing angle is changed.

Figure 9:
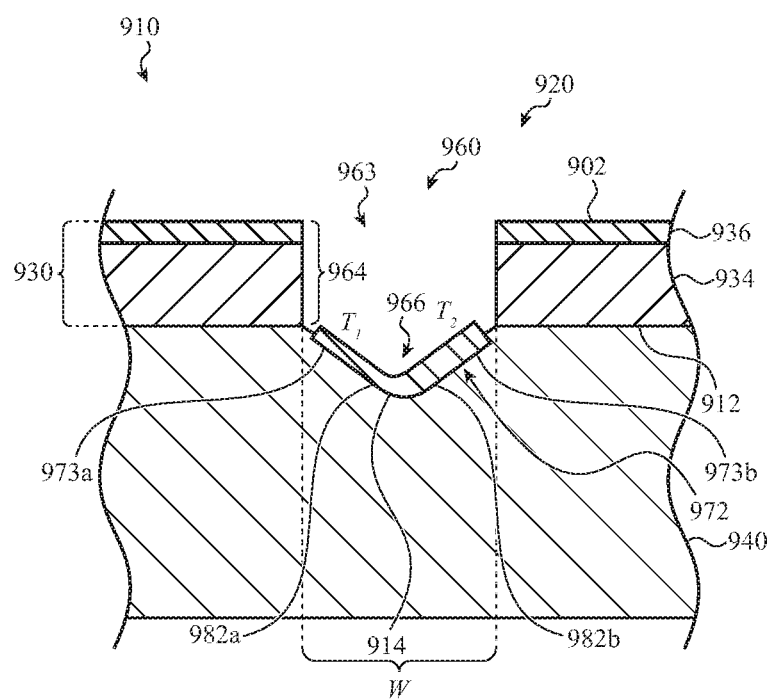
FIG. 9 shows a schematic cross-sectional view of a further example marking comprising a recessed marking feature including a geometric feature and a metal oxide layer.

FIG. 9 shows a schematic cross-sectional view of an additional example marking 920. The marking 920 includes a relief feature 960 comprising a geometric feature 972 and a recessed marking feature 966. As shown in FIG. 9, the recessed marking feature 966 comprises a metal oxide layer including a first portion 982*a* having a first thickness $T_1$ and a second portion 982*b* having a second thickness $T_2$. As shown, the first thickness is less than the second thickness. Metal oxide portions 982*a*, 982*b* are formed along an exterior surface 914 of a metal material 940 and along at least a portion of the exterior surface of the geometric feature 972. As previously discussed, the thickness of the first portion 982*a* and the second portion 982*b* of the oxide layer may each have a thickness or a thickness range configured to produce a desired hue or combination of hues, such as at a desired viewing angle. In embodiments, the desired viewing angle is about normal to the coating 930.

As shown in FIG. 9, the geometric feature 972 may be a groove formed in the exterior surface 914 of the metal material 940. The groove 972 may have a cross-sectional shape which defines walls 973*a* and 973*b*. An angle between the walls 973*a* and 973*b* may be greater than about 45 degrees and less than 180 degrees or from about 60 degrees to about 120 degrees. The groove 972 may have a width about equal to the width W of the recessed marking feature 966, such as from about 80% to 100% of the width of the recessed marking feature 966.

As shown, the metal oxide layer extends across a width about equal to the width W of the recessed marking feature 966. An exterior surface of the oxide layer on wall 973*a* may form an angle with an exterior surface of the oxide layer on wall 973*b* due to the underlying groove geometry. This angle may be greater than about 45 degrees and less than 180 degrees or from about 60 degrees to about 120 degrees.

As shown in FIG. 9, a device component 910 includes the marking 920 along an exterior surface 902 of the article. The device component 910 includes a coating 930 along an exterior surface 912 of the metal material 940. The coating includes a first layer 934 and a second layer 936. The marking 920 comprises a relief feature 960 including the recessed marking feature 966 and a recess wall 964. Recess wall 964 at least partially defines a recess 963.

In additional aspects, a marking includes at least two recessed marking features. For example, a first recessed marking feature may define a first region which is visually distinct from the coating. Each of the first and the second recessed marking feature may include a geometric feature, a color feature, a texture feature, or a combination thereof. The second recessed marking feature may have a visual attribute different from the first recessed marking feature. The second recessed marking feature may at least partially surround the first recessed marking feature, or vice versa. FIGS. 10A, 10B, 11A, 11B, and 11C illustrate non-limiting examples of markings including two recessed marking features.

The first and the second recessed marking features may encompass equal or unequal portions of the marking. The visual attribute(s) of the larger of the first recessed marking feature and the second recessed marking feature may dominate the appearance of the marking. For example, if the second recessed marking feature is thin relative to the first recessed marking feature, the attributes of the first recessed marking feature may largely determine the appearance of the marking. For example, the second recessed marking feature may have a width less than that of the first recessed marking feature and may form a complete or partial perimeter around the first recessed marking feature.

Figure 10A:
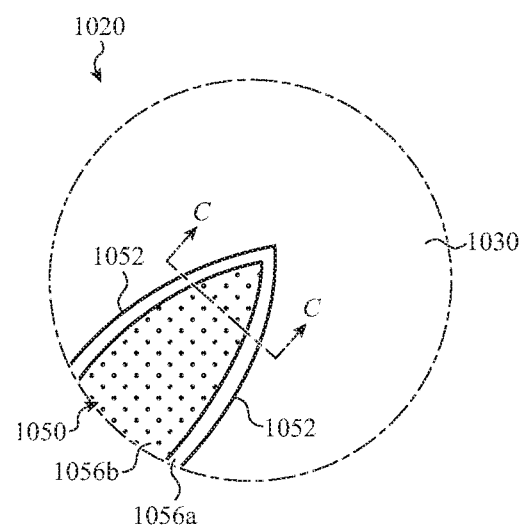
FIG. 10A shows an enlarged view of an additional example marking showing a top view of a relief feature.

FIG. 10A shows an enlarged view of an additional example marking 1020 of FIG. 1A showing a top view of a relief feature 1050. As shown in FIG. 10A, the relief feature 1050 comprises recessed marking features 1056*a*, 1056*b*. As shown, the recessed marking feature 1056*b* includes a texture feature and is visually distinct from a coating 1030. The relief feature 1050 also includes a recessed marking feature 1056*a* which defines a perimeter at least partially surrounding the recessed marking feature 1056*b*. The relief feature 1050 also includes a perimeter 1052 around recessed marking feature 1056 and defined by the coating 1030.

Figure 10B:
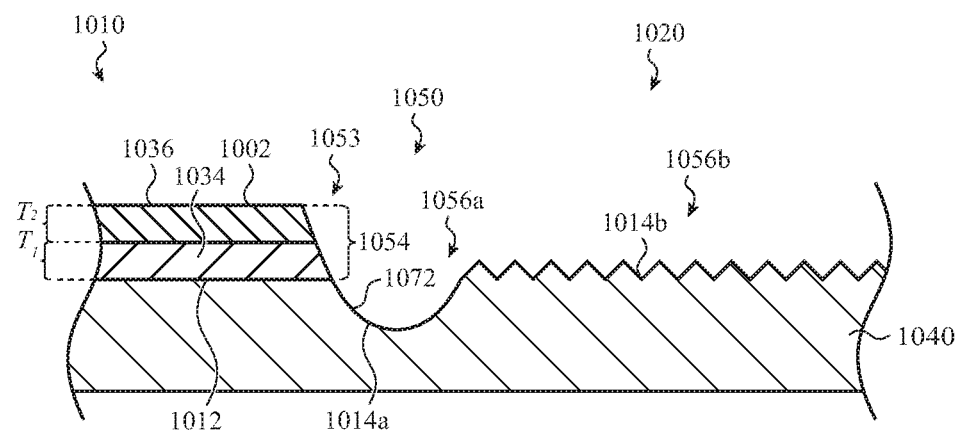
FIG. 10B shows a schematic cross-sectional view of the marking of FIG. 10A.

FIG. 10B shows a schematic cross-sectional view of the marking 1020 of FIG. 10A. As illustrated in FIG. 10B, the marking 1020 includes a relief feature 1050. A recessed marking feature 1056*a* of the relief feature 1050 includes a channel 1072 formed in an exterior surface 1014*a* of a metal material 1040. As shown, the channel 1072 is proximate a recess wall 1054 of the relief feature 1050.

As shown in FIG. 10B, the marking 1020 also includes a recessed marking feature 1056*b*. The recessed marking feature 1056*b* includes a surface roughness formed in exterior surface 1014*b* of the metal material. The recessed marking feature 1056*b* may be wider than the recessed marking feature 1056*b*.

As shown in FIG. 10B, a device component 1010 includes the marking 1020 along an exterior surface 1002 of the article. The device component 1010 includes a coating 1030 along an exterior surface 1012 of the metal material 1040. The coating includes a first layer 1034 having a thickness $T_1$ and a second layer 1036 having a thickness $T_2$. The relief feature 1050 includes a recess wall 1054. The recess wall 1054 at least partially defines a recess 1053.

Figure 11A:
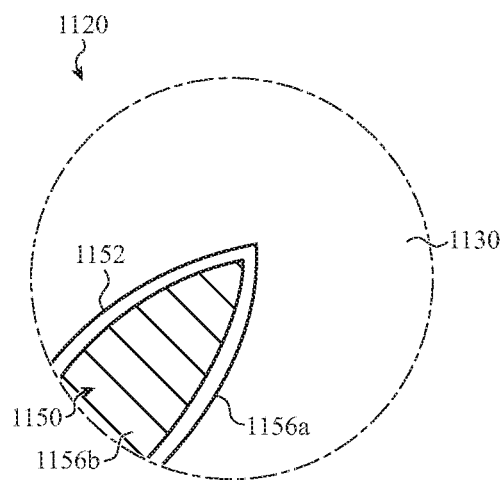
FIG. 11A shows an enlarged view of a further example marking showing a top view of a relief feature.

FIG. 11A shows an enlarged view of a further example marking 1120 of FIG. 1A showing a top view of a relief feature 1150. As shown in FIG. 11A, the relief feature 1150 comprises recessed marking features 1156a, 1156b. A shown, the recessed marking feature 1156b includes multiple grooves arranged in a hatching pattern and is visually distinct from a coating 1130. The relief feature 1150 also includes a recessed marking feature 1156a which defines a perimeter at least partially surrounding the recessed marking feature 1156b. The relief feature 1150 also includes a perimeter 1152 around the recessed marking feature 1156a and defined by the coating 1130.

Figure 11B:
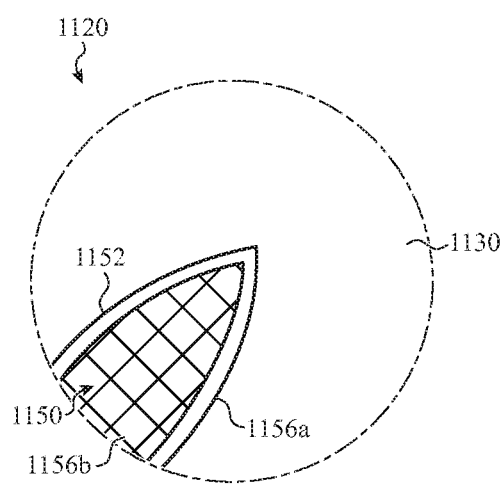
FIG. 11B shows an enlarged view of another example marking showing a top view of a relief feature.

As shown in FIG. 11B, relief feature 1150 comprises recessed marking feature 1150. As shown in FIG. 11B, relief feature 1150 comprises recessed marking features 1156a, 1156b. A shown, recessed marking feature 1156b includes multiple grooves arranged in cross-hatching pattern and is visually distinct from coating 1130. Relief feature 1150 also includes recessed marking feature 1156a which defines a perimeter at least partially surrounding recessed marking feature 1156b. The relief feature 1150 also includes a perimeter 1152 around the recessed marking feature 1156a and defined by the coating 1130.

Figure 11C:
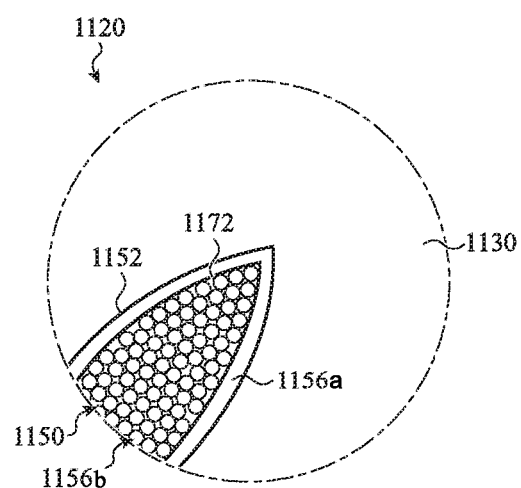
FIG. 11C shows an enlarged view of an additional marking showing a top view of a relief feature.

FIG. 11C shows an enlarged view of another marking of FIG. 1A showing a top view of a relief feature 1150. As shown in FIG. 11B, the relief feature 1150 comprises recessed marking features 1156a, 1156b. Recessed marking feature 1156b includes multiple circular geometric features 1172 and is visually distinct from coating 1130. Relief feature 1156 also includes recessed marking feature 1156a which defines a perimeter at least partially surrounding recessed marking feature 1156b. The relief feature 1150 also includes a perimeter 1152 around the recessed marking feature 1156a and defined by the coating 1130.

The current description also encompasses processes for forming a marking along an exterior surface of an article. The article may be an electronic device. The processes may be performed on an article comprising a device component. The device component may comprise a substrate comprising a metal material and may further comprise a coating disposed over an exterior surface of the substrate. The coating may be a multilayer coating as described herein comprising a first layer disposed over the metal material and a second layer disposed over the first layer. The electronic device may include markings formed along an external surface of the device component, within the coating, or a combination thereof.

In embodiments, the processes for forming a marking along an external surface of the device component comprise laser ablating the coating in the marking area to expose a metal portion of the device component and laser modifying the metal portion to create a recessed marking feature. The operation of laser modifying the metal portion may comprise at least one of laser texturing and laser coloring the metal portion. In addition, the operation of laser modifying the metal portion may comprise laser shaping the metal portion to form a geometric feature. For example, the metal portion may be laser shaped through ablation to form a depression; the depression may then be laser textured and/or laser colored. The metal portion may be laser textured through ablation, partial melting, or combinations thereof. In embodiments, the metal portion may be laser colored through annealing without substantial ablation or melting.

Figure 12:
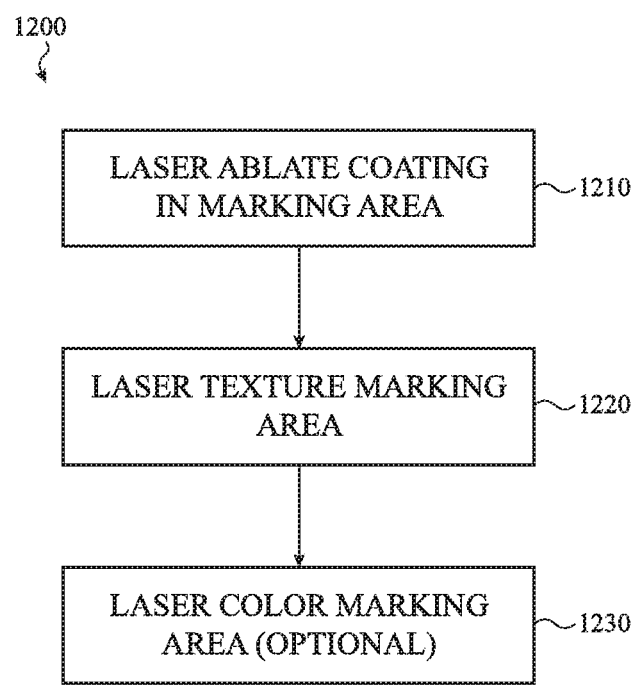
FIG. 12 shows a flowchart of an example process for making a marking.

FIG. 12 illustrates a flowchart of an example process 1200 for forming a marking along an exterior surface of an article. Process 1200 may be used to form a relief feature having a recessed marking feature. The recessed marking feature may be formed along an exterior surface of substrate comprising a metal material; a texture feature and/or geometric feature may be formed in a metal portion of the substrate to produce a visual effect. As examples, process 1200 may be used to form the recessed marking features of FIGS. 1D, 1E, and 2-5 along an exterior surface of the metal portion. As used herein, a metal portion may include a metal alloy portion.

Operation 1210 comprises laser ablating the coating in a marking area of the article. The marking area is along an exterior surface of the article defined by an exterior surface of the coating. As an example, operation 1210 comprises removing, using a first laser, a first portion of the coating which is located in the marking area. The operation of laser ablating the coating in the marking area may use a first laser. For example, the first laser may be a femtosecond laser producing pulses having an effective pulse duration in the femtosecond range. The first laser may produce a wavelength in the ultraviolet range (e.g., having a wavelength from about 200 nm to about 400 nm). Alternately, the first laser may produce a wavelength in the infrared range (e.g., having a wavelength from about 1 µm to about 5 µm). The first laser may be operated in a vector mode, a raster mode, or a combination thereof.

For example, a vector mode may be used to laser ablate an outline in the first portion of the coating and a raster mode may be used to laser ablate coating within the outline, thereby laser ablating a remainder of the first portion of the coating. In some embodiments, the wavelength used to ablate an outline in the first portion of the coating may be different than the wavelength used to remove a remainder of the first portion of the coating within the outline.

By the way of example, a laser used to ablate an outline in the first portion of the coating may have a pulse duration from about 200 fs to about 800 fs, an average power from about 0.5 W to about 15 W or about 1 W to about 10 W. The repetition rate may be from about 10 kHz to 750 kHz, from about 10 kHz to about 500 kHz, or from about 10 kHz to about 100 kHz. In some embodiments, the laser may be operated in burst mode, with each burst including multiple pulses. In embodiments, the number of pulses in the burst may be from 5 to 25. The scan speed may be from about 1 mm/sec to about 50 mm/sec. The laser used to form the outline may be operated in vector mode.

In addition, a laser operated to remove a remainder of the first portion of the coating may have an average power, a repetition rate and/or a scan speed higher than that used to form the outline. For example, the pulse duration may be from about 200 fs to about 800 fs, the average power may be from about 0.5 W to about 15 W or about 1 W to about 10 W. The repetition rate may be from about 50 kHz to about 1000 kHz or from about 200 kHz to about 750 kHz. In some embodiments, the laser may be operated in burst mode, with each burst including multiple pulses. In embodiments, the number of pulses in the burst may be from 5 to 25. The scan speed may be from about 100 mm/sec to about 1000 mm/sec, the hatch distance from about 5 µm to about 30 µm, and the number of passes from 1 to 8. The spot size may be from 10 µm to 50 µm. The laser used to remove the remainder of the first portion of the coating may be operated in raster mode. In embodiments, the same laser may be used to form the outline as to remove the remainder of the first portion of the coating or different lasers may be used.

Figure 13A:
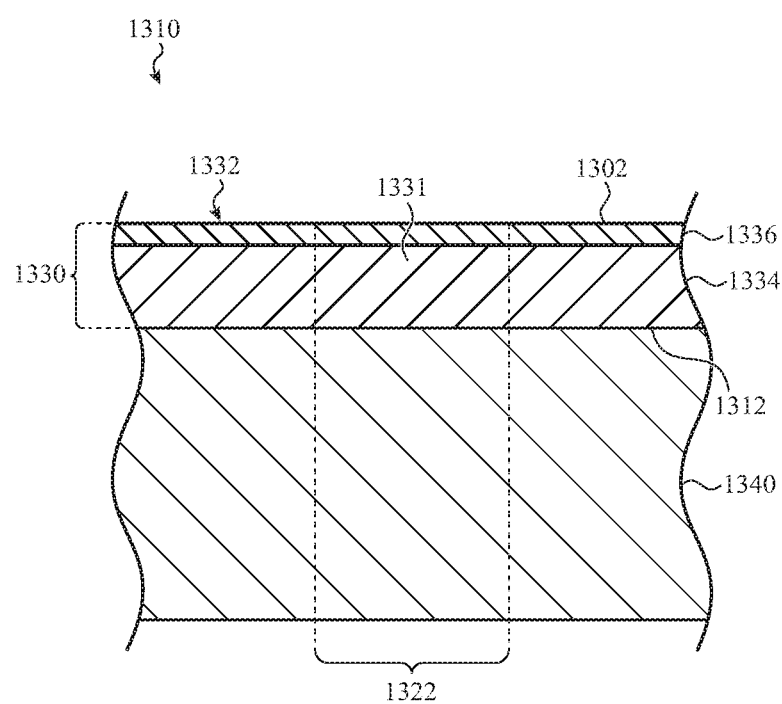
FIGS. 13A, 13B, 13C, and 13D schematically show stages in an example process for making a marking.
Figure 13B:
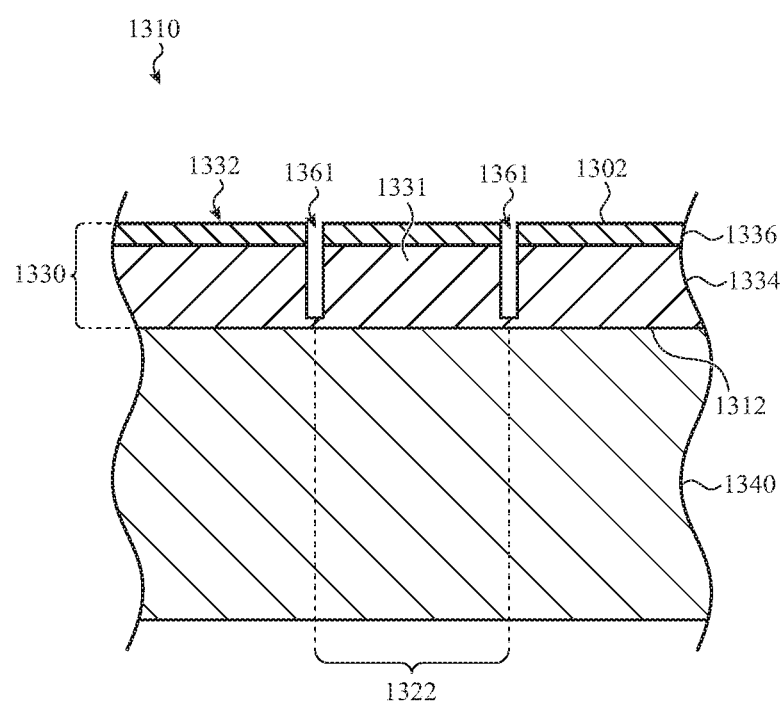

As explained in further detail with respect to FIGS. 13A and 13B, the operation of removing the first portion of the coating using the first laser may form a recess extending through the coating. A second portion (remainder portion) of the coating surrounds the recess and defines a recess wall. The operation of removing the first portion of the coating also exposes a metal portion of the substrate. The exposed metal portion is under the recess. The exposed metal portion may alternately be referred to as a metal portion.

In embodiments, the laser(s) used in operation 1210 may be operated under conditions which minimize damage to the coating defining and adjacent to the recess wall. The coating may be a multilayer coating including a first layer and a second layer as previously described. In an example, few, if any, visually observable cracks are produced in the second layer and/or the recess wall during operation 1210. In some embodiments, heating of the second layer during operation 1210 may help prevent cracking of this layer.

As previously discussed, the process of forming a marking along an exterior surface of an article may comprise modifying the exposed metal portion, using a laser, to create a recessed marking feature of the relief feature. The operation 1220 of the process 1200 comprises laser texturing within the marking area of the article. The operation of laser texturing may form a texture feature, a geometric feature, or a combination thereof into the exposed metal portion. In some embodiments, the operation of laser texturing may also affect the color of the marking feature. For example, the surface roughness of the marking feature may affect the brightness or darkness of the marking feature.

The operation of laser texturing may use a second laser. For example, the second laser may be a femtosecond laser producing pulses having an effective pulse duration in the femtosecond range. For example, the femtosecond laser may be used to form one or more geometric features into the exposed metal portion (e.g., hatching as shown in FIGS. 11A-11B). The femtosecond laser may produce a wavelength in the infrared range. The second laser may be operated in a vector mode, a raster mode, or a combination thereof. The pulse duration may be from 200 fs to 800 fs, the average power may be from about 0.01 W to about 15 W, from about 1 W to about 15 W, or from about 0.01 W to about 5 W, and the repetition rate may be from about 50 kHz to about 750 kHz or from about 50 kHz to about 300 kHz. In some embodiments, the laser may be operated in burst mode, with each burst including multiple pulses. In embodiments, the number of pulses in the burst may be from 5 to 25. The scan speed may be from about 750 mm/sec to about 1500 mm/sec, the hatch distance up to 50 μm, and the number of passes from 1 to 25. The spot size may be from about 10 μm to about 50 μm. Some geometric features, such as those shown in FIGS. 7 and 8, may be formed using multiple passes of the second laser. In some embodiments, the operation of laser texturing includes multiple laser texturing operations at different laser operating conditions.

In some embodiments, a nanosecond laser producing pulses having an effective pulse duration in the nanosecond range may be used in addition to or as an alternate to a femtosecond laser. For example, the nanosecond laser may be used to polish the exposed metal portion, thereby modifying the roughness of the exposed metal portion. The laser may produce a wavelength in the near infrared range. The pulse duration may be from about 2 ns to about 300 ns, the average power may be from about 0.01 W to about 15 W, from about 0.01 W to about 5 W, or from about 1 W to about 10 W. The repetition rate may be from about 50 kHz to about 400 kHz. In some embodiments, the laser may be operated in burst mode, with each burst including multiple pulses. In embodiments, the number of pulses in the burst may be from 5 to 25. The scan speed may be from about 200 mm/sec to about 2000 mm/sec, the hatch distance from about 5 μm to about 30 μm, and the number of passes from 1 to 10. The spot size may be from about 10 μm to about 50 μm.

Process 1200 may optionally include operation 1230 of laser coloring the marking area. Operation 1230 may occur as part of an annealing operation. As an example, operation 1230 comprises modifying the exposed metal portion of the substrate, using a third laser, to create a color feature along an exterior surface of the metal portion. In embodiments, the operation of laser coloring the marking area produces a structural color. As previously discussed, structural colors may result from a variety of effects including interference of light, diffraction of light, and combinations thereof.

In embodiments, operation 1230 comprises thermally growing a metal oxide layer in the marking area of the article. The metal oxide layer may provide a structural color through interference of light. As an example, operation 1230 comprises modifying the exposed metal portion of the substrate, using a third laser, to create a metal oxide layer along an exterior surface of the metal portion. In some embodiments, the operation of thermally growing the oxide layer includes multiple oxide growth operations at different laser operation conditions, for example at different locations on the exterior surface of the metal material.

In additional embodiments, operation 1230 comprises forming diffraction features along the exterior of the metal portion which provide a structural color through diffraction of light. In further embodiments, operation 1230 gives a desired metallic color to the marking area. The metallic color may be characterized by a reflectivity as well as a color. In some embodiments, a steel, titanium, or titanium alloy substrate may be given the appearance of a metal such as silver, palladium, platinum, or gold. In further embodiments, a metallic color may be obtaining by limiting the extent of annealing of the metal portion, such as by using a relatively low power and/or a relatively high scan speed.

In embodiments, operation 1230 may use a nanosecond laser producing pulses having an effective pulse duration in the nanosecond range. In embodiments, the nanosecond laser is used to form a metal oxide layer. The nanosecond laser may produce a wavelength in the near infrared range. The pulse duration may be from about 2 ns to about 500 ns, the average power may be from about 1 W to about 15 W, and the repetition rate may be from about 100 kHz to about 750 kHz or from about 100 kHz to about 500 kHz. In some embodiments, the laser may be operated in burst mode, with each burst including multiple pulses. In embodiments, the number of pulses in the burst may be from 5 to 25. The scan speed may be from about 100 mm/sec to about 2000 mm/sec or from about 100 mm/sec to about 800 mm/sec. The number of passes may be from 1 to 15 or 2 to 20. The spot size may be from about 10 μm to about 50 μm. The hatch distance may be up to about 50 μm, or from about 10 μm to about 30 μm. In embodiments, the hatch distance may be less than, approximately equal to, or greater than the spot size.

In additional embodiments, operation 1230 may use a femtosecond laser producing pulses having an effective pulse duration in the femtosecond range. The femtosecond laser may produce a wavelength in the near infrared range. The pulse duration may be from 200 fs to 800 fs, the average power may be from about 1 W to about 15 W, and the repetition rate may be from about 100 kHz to about 750 kHz. In some embodiments, the laser may be operated in burst mode, with each burst including multiple pulses. In embodiments, the number of pulses in the burst may be from 5 to 25. The scan speed may be from about 800 mm/sec to about 1200 mm/sec or from about 1000 mm/sec to about 1750 mm/sec, the hatch distance up to 50 µm, and the number of passes from 1 to 10. The spot size may be from about 5 µm to about 50 µm.

FIGS. 13A, 13B, 13C, and 13D schematically illustrate three stages in an example process for forming a marking along an exterior surface of an article. FIG. 13A shows a device component 1310 of the article prior to any process operations. The device component 1310 comprises a coating 1330 disposed over an exterior surface 1312 of a metal material 1340. As shown in FIGS. 13A-13D the coating 1330 comprises a first layer 1334 and a second layer 1336. An exterior surface of second layer 1336 forms an exterior surface 1302 of the article. The area over which the marking is to be formed (marking area 1322), the first portion 1331 of the coating to be removed, and a second portion 1332 of the coating to remain are also shown.

FIG. 13B shows the device component 1310 of the article partially through the operation of removing the first portion of the coating (1331 as shown in FIG. 13A) using the first laser (not shown). Recess 1361 has been formed at a periphery of the marking area 1322 through second layer 1336 and a portion of first layer 1334 of the coating 1330. The recess 1361 therefore can form an outline for the marking area 1322. The coating 1330 is disposed over an exterior surface 1312 of the metal material 1340 and an exterior surface of second layer 1336 forms an exterior surface 1302 of the article.

The operation of removing the first portion of the coating may continue by removing a remainder of the first portion of the coating within the outline defined by recess 1361 and also below recess 1361. Different laser conditions may be used to form the outline than to remove the remainder of the first portion of the coating. In embodiments, the laser used to form the outline may be operated under conditions which minimize damage to the second layer 1336 in the second portion 1332 of the coating 1330. For example, the laser used to form the outline may be operated at a lower power and/or at a lower repetition rate as described for the operation 1210 of the process 1200.

Figure 13C:
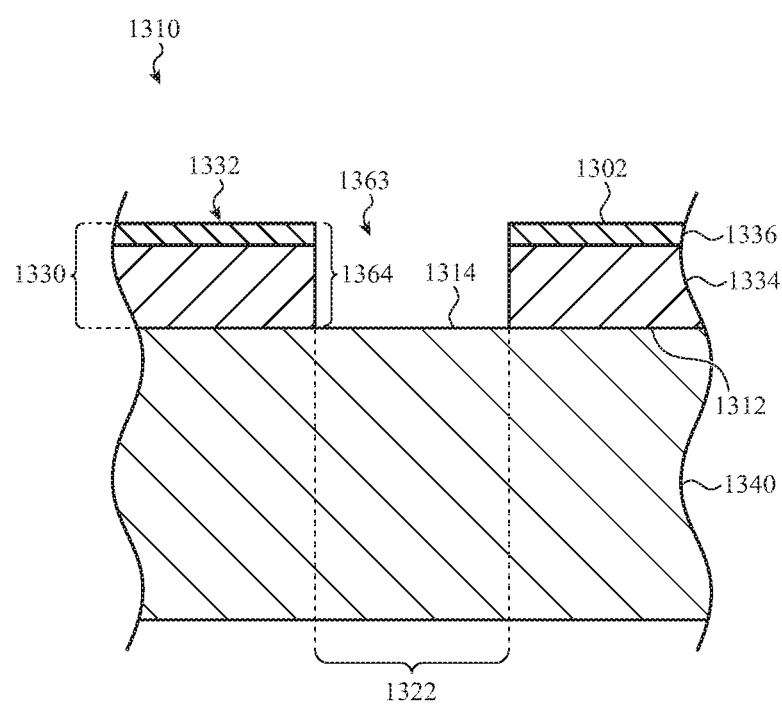
Figure 13D:
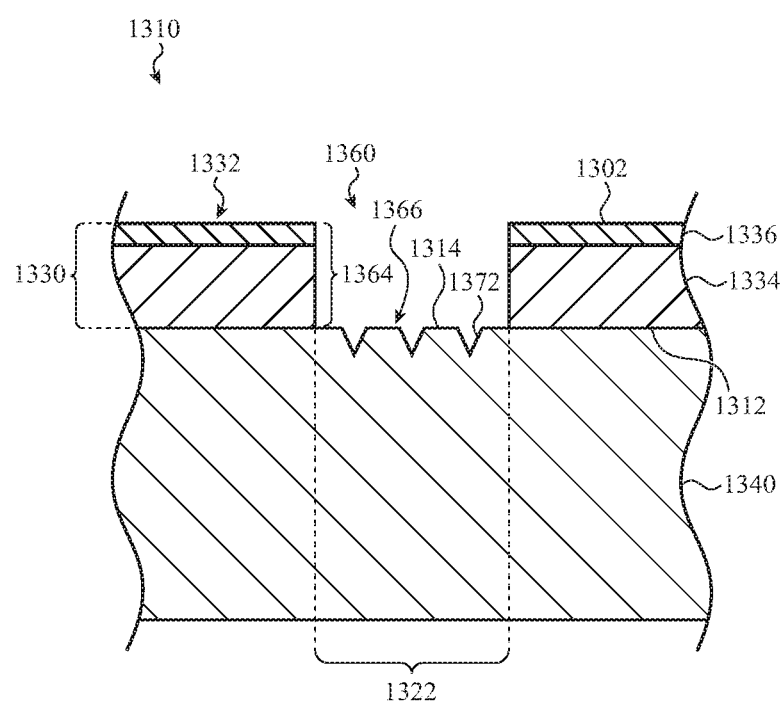

As shown in FIG. 13C, the operation of removing the first portion 1331 of the coating 1330 in the marking area 1322 may creates a recess 1363 extending through the coating 1330 and surrounded by the second portion 1332 of the coating 1330. As previously discussed with respect to FIG. 12, a first laser may be used to remove the first portion 1331 of the coating 1330. The second portion 1332 of the coating 1330 surrounding the recess 1363 defines a recess wall 1364. As shown in FIG. 13D, the recess wall 1364 can be part of the relief feature 1360. In embodiments, the operation of removing the first portion 1331 of the coating 1330 produces few, if any, cracks in the recess wall 1364. For example, the operation of removing the first portion 1331 of the coating 1330 may produce a recess wall 1364 which has no cracks visually discernable to the human eye at a normal viewing distance. Therefore, the multilayer coating may not include visible cracks along the recess wall.

The operation of removing the first portion 1331 of the coating also creates an exposed metal portion of the substrate 1340 under the recess 1353. As illustrated in FIG. 13C, the exposed metal portion may correspond to an exterior surface 1314 of the substrate 1340. The exterior surface 1314 is not required to be at the same height as the exterior surface 1312 of the metal material 1340 (under the second portion 1332 of the coating). For example, the operation of removing the first portion 1331 of the coating 1330 may cause the exterior surface 1314 to be recessed with respect to the exterior surface 1312. In some embodiments, the exterior surface 1314 is recessed by 5 µm or less, 3 µm or less, 2 µm or less, or 1 µm or less with respect to the exterior surface 1312.

FIG. 13D shows the device component 1310 after laser texturing within the marking area 1322 of the article. As an example, modifying the exposed metal portion/exterior surface 1314 of the substrate 1340 creates a recessed marking feature 1366 of the relief feature 1360. As previously discussed with respect to FIG. 12, the exposed metal portion/exterior surface 1314 may be modified using a second laser. The recessed marking feature 1366 may comprise a geometric feature 1372, such as a groove, formed into the exterior surface 1314 as illustrated in FIG. 13D. As previously described with respect to FIG. 12, the recessed marking feature 1366 may alternately or additionally comprise a metal oxide layer formed along exterior surface 1314. Additional description of features which are shared or similar to those previously described with respect to any of FIG. 13A-13C is omitted to reduce redundancy.

Figure 14:
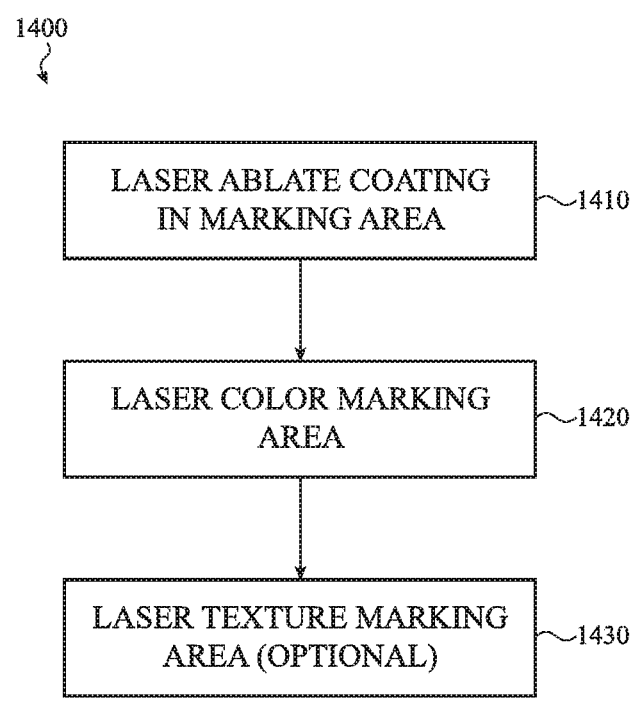
FIG. 14 shows a flowchart of an additional example process for making a marking.

FIG. 14 illustrates a flowchart of an example process 1400 for forming a marking along an exterior surface of an article. The process 1400 may be used to form a relief feature having a recessed marking feature. The recessed marking feature may be formed along an exterior surface of an exposed metal portion of a substrate; an oxide layer may be formed along the exterior surface of the exposed metal portion to produce a visual effect. As examples, process 1400 may be used to form the recessed marking features of FIGS. 6-8.

The operation 1410 of the process 1400 comprises laser ablating the coating in a marking area of the article. The marking area is along an exterior surface of the article defined by an exterior surface of the coating. As an example, operation 1410 comprises removing, using a first laser, a first portion of the coating. For example, the first laser may be a femtosecond laser producing pulses having an effective pulse duration in the femtosecond range. The first laser may produce a wavelength in the ultraviolet range. The first laser may be operated in a vector mode, a raster mode, or a combination thereof. The laser operating conditions may be as previously described for the operation 1210 of the process 1200 and, for brevity, that description is not repeated here.

As previously described with respect to the operation 1210 of the process 1200, the operation 1410 may comprise ablating an outline in a first portion of the coating followed by removing a remainder of the first portion of the coating. Different laser conditions may be used to form the outline than to remove the remainder of the first portion of the coating. For example, the laser conditions may be as described for the operation 1210 of the process 1210 and, for brevity, that description is not repeated here.

The operation 1410 of removing the first portion of the coating using the first laser can form a recess extending through the coating and surrounded by a second portion of the coating. The operation of removing the first portion of the coating also can create an exposed metal portion of the substrate under the recess extending through the coating. The operation of removing the first portion of the coating may be similar to that schematically illustrated by FIGS. 13A, 13B and 13C.

The operation 1420 of the process 1400 comprises laser coloring the marking area. In embodiments, the operation 1420 comprises thermally growing a metal oxide layer in the marking area of the article. As an example, the operation 1420 comprises modifying the exposed metal portion, using a second laser, to create a metal oxide layer along an exterior surface of the exposed metal portion. For example, the second laser may be a nanosecond laser producing pulses having an effective pulse duration in the nanosecond range. The laser may produce a wavelength in the near infrared range. In additional embodiments, the second layer may be a femtosecond laser producing pulses having an effective pulse duration in the femtosecond range. The laser conditions may be similar to those described for the operation 1230 of the process 1200 shown in FIG. 12 and, for brevity, that description is not repeated here. In some embodiments, the operation of thermally growing the oxide layer includes multiple oxide growth operations at different laser operation conditions, for example at different locations on the exterior surface of the metal material.

Process 1400 optionally includes an operation of 1430 of laser texturing the laser colored marking area. Laser texturing the laser colored area can comprise ablating a metal oxide or can comprise deeper ablation into the metal material, such as the metal material below the metal oxide. The operation of laser texturing may use a third laser. For example, the third laser may be a femtosecond laser producing pulses having an effective pulse duration in the femtosecond range. The third laser may produce a wavelength in the infrared range. The third laser may be operated in a vector mode, a raster mode, or a combination thereof. The pulse duration may be from 200 fs to 800 fs, the average power may be from about 0.01 W to about 15 W or from about 0.05 W to about 5 W, or from about 1 W to about 15 W. The repetition rate may be from about 10 kHz to about 100 kHz or from about 50 kHz to about 750 kHz. The scan speed may be from about 200 mm/sec to about 1500 mm/sec, the hatch distance from about 5 µm to about 30 µm, and the number of passes from 1 to 10. The spot size may be from 10 µm to 50 µm. In some embodiments, the laser may be operated in burst mode, with each burst including multiple pulses. In embodiments, the number of pulses in the burst may be from 5 to 25. In some embodiments, the average power may be less than that used in the laser coloring operation.

Figure 15:
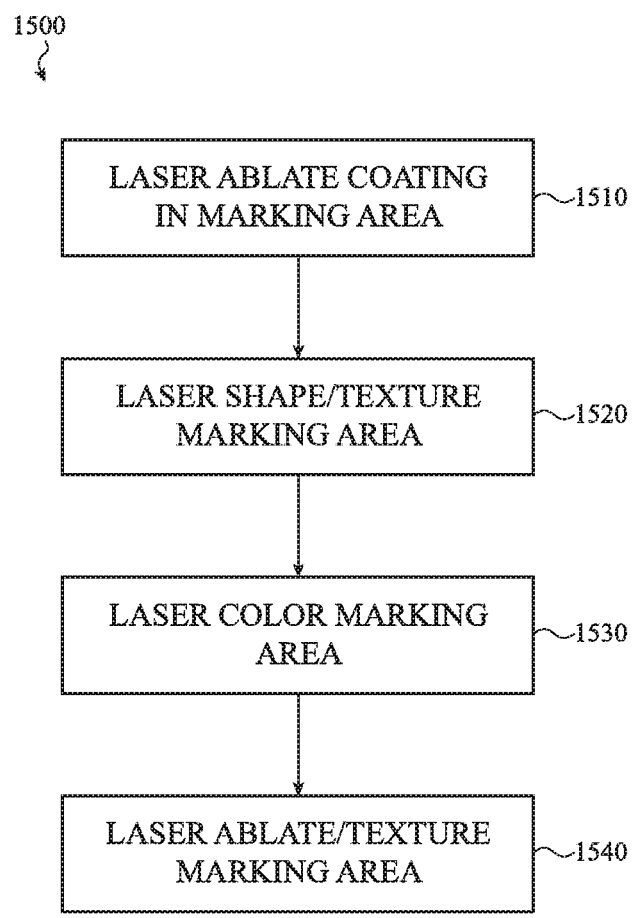
FIG. 15 shows a flowchart of another example process for making a marking.

FIG. 15 shows a flowchart of an additional process 1500 for making a marking. The process 1500 includes an operation 1510 of laser ablating the coating in a marking area. Process conditions for the operation 1510 may be similar to those of the operation 1210 of the process 1200 shown in FIG. 12 and, for brevity, that description is not repeated here.

The process 1500 further includes an operation 1520 of laser shaping and/or texturing the marking area. As an example, the metal portion may be laser shaped through ablation to form a depression or other geometric shape and then laser textured to polish the laser-formed shape. The process conditions for laser shaping may be similar to those described for forming a geometric shape in the operation 1220 of the process 1200 of FIG. 12 and, for brevity, that description is not repeated here. The process conditions for laser texturing the marking area may also be similar to those described for the operation 1220 of the process 1200 shown in FIG. 12 and, for brevity, that description is not repeated here.

Process 1500 further includes operation 1530 of laser coloring the marking area. Typically, operation 1530 follows operation 1520. Process conditions for the operation 1530 may be similar to those described for the operation 1230 of the process 1200 shown in FIG. 12.

In addition, process 1500 includes operation 1540 of laser ablating and/or texturing the marking area following thermal growth of the metal oxide layer. For example, the operation of laser texturing the marking area may include modifying the metal oxide layer, using a laser, to produce the recessed marking feature of the relief feature. The laser may ablate the metal oxide layer to produce one or more desired thicknesses in the oxide or to produce a geometric feature such as a groove. In embodiments, the laser is a femtosecond laser. The laser conditions may be similar to those described for the operation 1430 of the process 1400 shown in FIG. 14 and, for brevity, that description is not repeated here. In additional embodiments, operation 1540 is optional.

Figure 16:
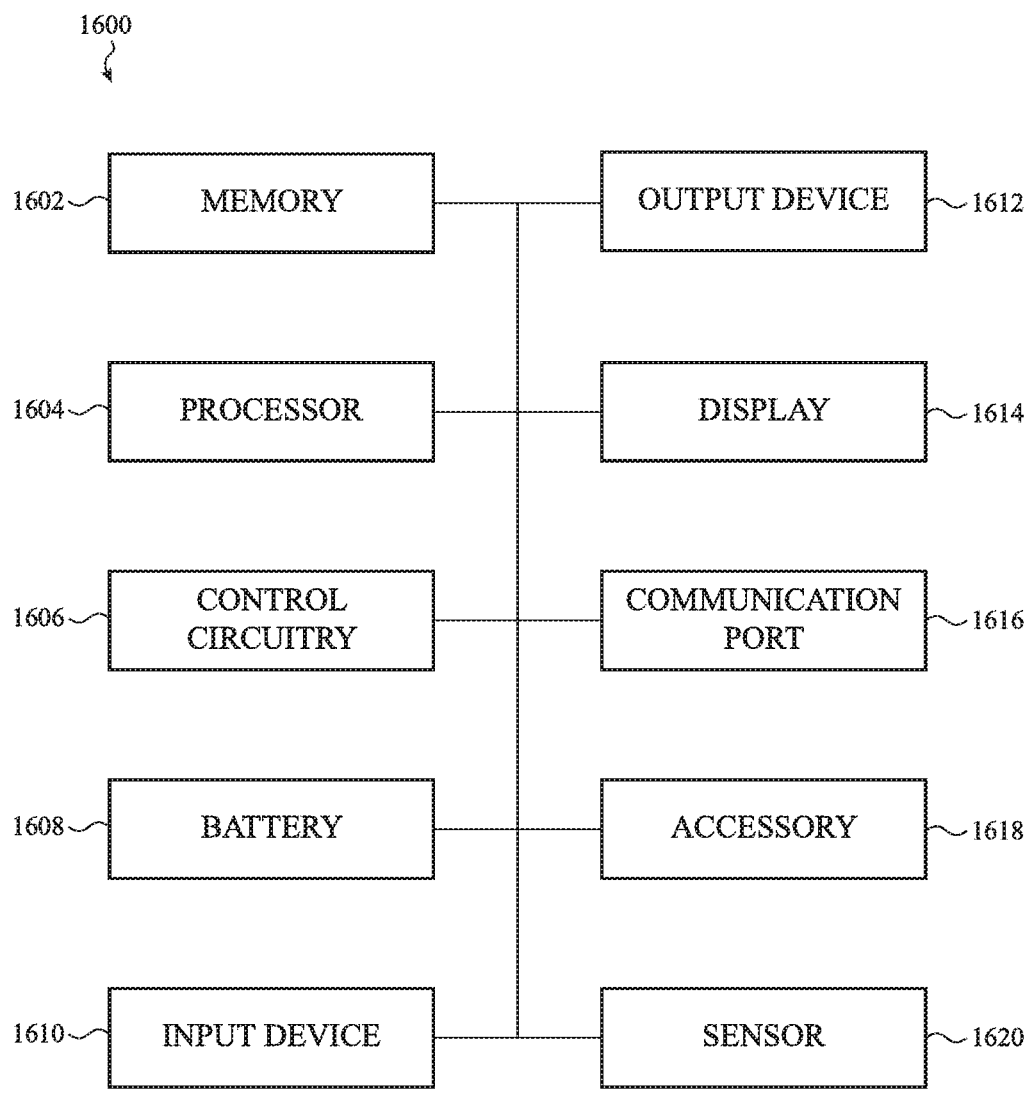
FIG. 16 shows a schematic representation of an electronic device.

FIG. 16 is a block diagram of example components of an example article or electronic device. The schematic representation depicted in FIG. 16 may correspond to the article (e.g., an electronic device) depicted in FIGS. 1A-1C as described above. However, the article of FIGS. 1A-1C need not include all the components shown in FIG. 16. FIG. 16 may also more generally represent other types of electronic devices with a marking, as described herein. Further, the marking techniques described herein may be used to mark a component of the electronic device 1600 including, for example, the device enclosure, housing, cover, or other device component As shown in FIG. 16, the electronic device 1600 includes a processor 1604 operably connected with a computer-readable memory 1602. The processor 1604 may be operatively connected to the memory 1602 component via an electronic bus or bridge. The processor 1604 may be implemented as one or more computer processors or microcontrollers configured to perform operations in response to computer-readable instructions. The processor 1604 may include a central processing unit (CPU) of the device 1600. Additionally and/or alternatively, the processor 1604 may include other electronic circuitry within the device 1600 including application specific integrated chips (ASIC) and other microcontroller devices. The processor 1604 may be configured to perform functionality described in the examples above. In addition, the processor or other electronic circuitry within the device may be provided on or coupled to a flexible circuit board in order to accommodate folding or bending of the electronic device.

The memory 1602 may include a variety of types of non-transitory computer-readable storage media, including, for example, read access memory (RAM), read-only memory (ROM), erasable programmable memory (e.g., EPROM and EEPROM), or flash memory. The memory 1602 is configured to store computer-readable instructions, sensor values, and other persistent software elements The electronic device 1600 may include control circuitry 1606. The control circuitry 1606 may be implemented in a single control unit and not necessarily as distinct electrical circuit elements. As used herein, "control unit" will be used synonymously with "control circuitry." The control circuitry 1606 may receive signals from the processor 1604 or from other elements of the electronic device 1600.

As shown in FIG. 16, the electronic device 1600 includes a battery 1608 that is configured to provide electrical power to the components of the electronic device 1600. The battery 1608 may include one or more power storage cells that are linked together to provide an internal supply of electrical power. The battery 1608 may be operatively coupled to power management circuitry that is configured to provide appropriate voltage and power levels for individual components or groups of components within the electronic device 1600. The battery 1608, via power management circuitry, may be configured to receive power from an external source, such as an alternating current power outlet. The battery 1608 may store received power so that the electronic device 1600 may operate without connection to an external power source for an extended period of time, which may range from several hours to several days. The battery may be flexible to accommodate bending or flexing of the electronic device. For example, the battery may be mounted to a flexible housing or may be mounted to a flexible printed circuit. In some cases, the battery is formed from flexible anodes and flexible cathode layers and the battery cell is itself flexible. In some cases, individual battery cells are not flexible, but are attached to a flexible substrate or carrier that allows an array of battery cells to bend or fold around a foldable region of the device.

In some embodiments, the electronic device 1600 includes one or more input devices 1610. The input device 1610 is a device that is configured to receive input from a user or the environment. The input device 1610 may include, for example, a push button, a touch-activated button, a touch screen (e.g., a touch-sensitive display or a force-sensitive display), capacitive touch button, dial, crown, or the like. In some embodiments, the input device 1610 may provide a dedicated or primary function, including, for example, a power button, volume buttons, home buttons, scroll wheels, and camera buttons.

The device 1600 may also include one or more sensors 1620, such as a force sensor, a capacitive sensor, an accelerometer, a barometer, a gyroscope, a proximity sensor, a light sensor, or the like. The sensors 1620 may be operably coupled to processing circuitry. In some embodiments, the sensors 1620 may detect deformation and/or changes in configuration of the electronic device and be operably coupled to processing circuitry which controls the display based on the sensor signals. In some implementations, output from the sensors 1620 is used to reconfigure the display output to correspond to an orientation or folded/unfolded configuration or state of the device. Example sensors 1620 for this purpose include accelerometers, gyroscopes, magnetometers, and other similar types of position/orientation sensing devices. In addition, the sensors 1620 may include a microphone, acoustic sensor, light sensor, optical facial recognition sensor, or other types of sensing device.

In some embodiments, the electronic device 1600 includes one or more output devices 1612 configured to provide output to a user. The output device may include display 1614 that renders visual information generated by the processor 1604. The output device may also include one or more speakers to provide audio output.

The display 1614 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 1614 is a liquid-crystal display or an electrophoretic ink display, the display may also include a backlight component that can be controlled to provide variable levels of display brightness. If the display 1614 is an organic light-emitting diode or organic electroluminescent type display, the brightness of the display 1614 may be controlled by modifying the electrical signals that are provided to display elements. In addition, information regarding configuration and/or orientation of the electronic device may be used to control the output of the display as described with respect to input devices 1610.

In embodiments, an electronic device 1600 may include sensors 1620 to provide information regarding configuration and/or orientation of the electronic device in order to control the output of the display. For example, a portion of the display 1614 may be turned off, disabled, or put in a low energy state when all or part of the viewable area of the display 1614 is blocked or substantially obscured. As another example, the display 1614 may be adapted to rotate the display of graphical output based on changes in orientation of the device 1600 (e.g., 90 degrees or 180 degrees) in response to the device 1600 being rotated.

The electronic device 1600 may also include a communication port 1616 that is configured to transmit and/or receive signals or electrical communication from an external or separate device. The communication port 1616 may be configured to couple to an external device via a cable, adaptor, or other type of electrical connector. In some embodiments, the communication port 1616 may be used to couple the electronic device to a host computer.

The electronic device may also include at least one accessory 1618, such as a camera, a flash for the camera, or other such device. The camera may be connected to other parts of the electronic device such as the control circuitry.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device, comprising:
   a device component comprising:
      a metal substrate;
      a coating layer formed along at least a front surface of the metal substrate and comprising:
         a first layer disposed over the at least the front surface of the metal substrate and comprising a polymer binder and inorganic pigment particles dispersed within the polymer binder; and
         a second layer disposed over the first layer and comprising a transparent polymer defining at least a portion of an exterior surface of the electronic device; and
      a marking formed along the exterior surface and comprising a laser-formed relief feature having:
         at least one recess wall partially defining a recess extending through the first layer and the second layer; and a recessed marking feature defining a bottom of the recess and visually distinct from an adjacent portion of the coating layer.

2. The electronic device of claim 1, wherein:
the recessed marking feature includes an oxide layer formed over the metal substrate; and
a color of the recessed marking feature is due, at least in part, to a thickness of the oxide layer.

3. The electronic device of claim 1, wherein:
the laser-formed relief feature includes:
a groove extending into the metal substrate and defining a pair of groove walls;
a first metal oxide layer extending along a first wall of the pair of groove walls and having a first thickness defining, in part, a first color; and
a second metal oxide layer formed along a second wall of the pair of groove walls, having a second thickness different from the first thickness, and defining, in part, a second color.

4. The electronic device of claim 3, wherein an apparent color of the recessed marking feature is due to a combined effect of the first color and the second color.

5. The electronic device of claim 3, wherein:
the groove is v-shaped; and
an angle defined between the first wall and the second wall of the pair of groove walls is from about 60 degrees to about 120 degrees.

6. The electronic device of claim 1, wherein the laser-formed relief feature further comprises a depression formed into the metal substrate.

7. The electronic device of claim 6, wherein a depth of the depression is less than 500 μm.

8. The electronic device of claim 1, wherein:
the recessed marking feature comprises a texture along the front surface of the metal substrate; and
the texture defines, at least in part, a reflectance of the recessed marking feature.

9. An electronic device comprising:
a device component comprising:
a metal material;
a multilayer coating formed over a surface of the metal material and comprising:
a first layer disposed over the surface of the metal material and comprising a binder and pigment particles dispersed within the binder; and
a second layer disposed over the first layer and comprising a transparent polymer; and
a marking formed into the multilayer coating and comprising:
a first recessed marking feature along the surface of the metal material and visually distinct from the multilayer coating; and
a laser-formed relief feature at least partially surrounding the first recessed marking feature and having:
a recess wall partially defining a recess extending through the first layer and the second layer of the multilayer coating; and
a second recessed marking feature visually distinct from an adjacent portion of the multilayer coating and defining, in part, a bottom of the recess.

10. The electronic device of claim 9, wherein:
the first recessed marking feature further comprises a metal oxide layer formed along the surface of the metal material; and
the first recessed marking feature has a marking color defined, at least in part, by a thickness of the metal oxide layer.

11. The electronic device of claim 9, wherein the first recessed marking feature further comprises:
a first metal oxide layer along a first region of the surface of the metal material and having a first thickness;
a second metal oxide layer along a second region of the surface of the metal material and having a second thickness; and
the first recessed marking feature has a first marking color defined, at least in part, by the first thickness and a second marking color defined, at least in part, by the second thickness.

12. The electronic device of claim 9, wherein the second recessed marking feature comprises a geometric feature formed into the metal material.

13. The electronic device of claim 9, wherein:
the pigment particles are titanium dioxide particles; and
the marking further comprises a color feature formed, in part, at an interface between the first layer and the second layer.

14. The electronic device of claim 9, wherein the multilayer coating does not include visible cracks along the recess wall.

15. A method comprising:
providing a device component of an electronic device, the device component comprising:
a metal substrate; and
a coating layer formed along a surface of the metal substrate and comprising:
a first layer disposed over the surface of the metal substrate and comprising a polymer binder and inorganic pigment particles dispersed within the polymer binder; and
a second layer disposed over the first layer and comprising a transparent polymer defining at least a portion of an exterior surface of the electronic device; and
producing a laser-formed relief feature included in a marking formed along the exterior surface of the electronic device, the operation of producing the laser-formed relief feature comprising:
removing, using a first laser, a portion of the coating layer to:
form at least one recess wall of the laser-formed relief feature, the at least one recess wall partially defining a recess extending through the first layer and the second layer; and
expose a portion of the metal substrate; and
modifying the portion of the metal substrate, using a second laser, to create a recessed marking feature of the laser-formed relief feature, the recessed marking feature visually distinct from an adjacent portion of the coating layer and defining a bottom of the recess.

16. The method of claim 15, wherein the first laser produces pulses having a duration in a femtosecond range and a wavelength in an ultraviolet range.

17. The method of claim 15, wherein the second laser produces pulses having a duration in a nanosecond range and a wavelength in an infrared range.

18. The method of claim 15, wherein the operation of removing the portion of the coating layer produces a crack-free coating region along the at least one recess wall.

19. The method of claim 15, wherein the recessed marking feature comprises a groove extending into the metal substrate and defining a pair of groove walls.

20. The method of claim 15, wherein:
the recessed marking feature includes an oxide layer formed over the metal substrate; and
a color of the recessed marking feature is due, at least in part, to a thickness of the oxide layer.

* * * * *